US012687118B2

(12) United States Patent
Andreoli et al.

(10) Patent No.: US 12,687,118 B2
(45) Date of Patent: Jul. 21, 2026

(54) TURBINE ENGINE WITH A ROTATING BLADE HAVING A FIN

(71) Applicant: GENERAL ELECTRIC COMPANY, Evendale, OH (US)

(72) Inventors: Valeria Andreoli, Watertown, MA (US); Shashwat Swami Jaiswal, Bengaluru (IN); Thomas William Vandeputte, Scotia, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/938,401

(22) Filed: Nov. 6, 2024

(65) Prior Publication Data

US 2025/0067193 A1 Feb. 27, 2025

Related U.S. Application Data

(63) Continuation of application No. 17/859,456, filed on Jul. 7, 2022, now Pat. No. 12,196,087.

(51) Int. Cl.
*F01D 11/08* (2006.01)
*F01D 11/02* (2006.01)

(52) U.S. Cl.
CPC .............. *F01D 11/08* (2013.01); *F01D 11/02* (2013.01); *F05D 2220/32* (2013.01); *F05D 2240/30* (2013.01); *F05D 2240/55* (2013.01)

(58) Field of Classification Search
CPC .......... F01D 11/02; F01D 11/08; F01D 11/12; F01D 11/122; F01D 5/12; F01D 5/14; F01D 5/20; F01D 5/225; F05D 2220/32; F05D 2240/30; F05D 2240/307; F05D 2240/55
See application file for complete search history.

(56) References Cited

U.S. PATENT DOCUMENTS

| | | | |
|---|---|---|---|
| 1,270,232 | A | 6/1918 | Steenstrup |
| 2,211,851 | A | 8/1940 | Flanders |
| 3,575,523 | A | 4/1971 | Gross |
| 5,531,568 | A | 7/1996 | Broadhead |
| 6,375,419 | B1 | 4/2002 | LeJambre et al. |
| 7,318,699 | B2 | 1/2008 | Serafini et al. |

(Continued)

FOREIGN PATENT DOCUMENTS

| | | | |
|---|---|---|---|
| CN | 102619570 | A | 8/2012 |
| CN | 104727858 | A | 6/2015 |

(Continued)

OTHER PUBLICATIONS

Patrick S. Rebholz et al., "Tip-Shroud Cutbacks in a Low-Pressure Gas Turbine Stage", Journal of Propulsion and Power, vol. 32, No. 5, Sep.-Oct. 2016, pp. 1077-1086.

(Continued)

*Primary Examiner* — Elton K Wong
(74) *Attorney, Agent, or Firm* — Wood Herron & Evans LLP

(57) ABSTRACT

A blade assembly for a gas turbine engine having an engine casing, with the blade assembly being configured to rotate about a rotational axis. The blade assembly having a blade, and at least one fin. The blade extending between a root and a tip, with the tip being spaced radially from the engine casing to define a space therebetween. The at least one fin extending radially with respect to the tip and into the space.

18 Claims, 11 Drawing Sheets

(56) References Cited

U.S. PATENT DOCUMENTS

| | | | | |
|---|---|---|---|---|
| 9,045,992 | B2 | 6/2015 | Roussille et al. | |
| 9,051,840 | B2 | 6/2015 | Mitsuhashi et al. | |
| 11,577,859 | B1 | 2/2023 | Howard et al. | |
| 2004/0091361 | A1 | 5/2004 | Wadia et al. | |
| 2005/0100439 | A1 | 5/2005 | Greim et al. | |
| 2005/0106025 | A1 * | 5/2005 | Snook | F01D 5/141 416/189 |
| 2008/0099177 | A1 | 5/2008 | Graham et al. | |
| 2009/0180892 | A1 | 7/2009 | Brittingham | |
| 2012/0003078 | A1 * | 1/2012 | Pikul | F01D 5/225 415/173.1 |
| 2012/0087775 | A1 | 4/2012 | Subramaniyan | |
| 2012/0163967 | A1 * | 6/2012 | Krautheim | F04D 29/526 29/889.22 |
| 2013/0156563 | A1 * | 6/2013 | Mahle | F04D 29/547 415/191 |
| 2013/0243604 | A1 | 9/2013 | Roussille et al. | |
| 2015/0192029 | A1 | 7/2015 | Roberts, III et al. | |
| 2015/0361817 | A1 | 12/2015 | Jouy et al. | |
| 2016/0003076 | A1 | 1/2016 | Aiello et al. | |
| 2016/0076385 | A1 | 3/2016 | Chouhan et al. | |
| 2016/0084103 | A1 | 3/2016 | Kahrs et al. | |
| 2017/0130588 | A1 | 5/2017 | Townes | |
| 2017/0306768 | A1 | 10/2017 | Szrajer et al. | |
| 2018/0230806 | A1 | 8/2018 | Zemitis et al. | |
| 2019/0013997 | A1 | 1/2019 | Schwindt et al. | |
| 2020/0072061 | A1 | 3/2020 | Weaver et al. | |
| 2020/0198806 | A1 | 6/2020 | Wirth et al. | |
| 2020/0271007 | A1 * | 8/2020 | Shibata | F01D 11/08 |
| 2021/0079795 | A1 | 3/2021 | Seshadri et al. | |
| 2021/0262358 | A1 | 8/2021 | Martet et al. | |
| 2022/0034231 | A1 | 2/2022 | Dupeyre et al. | |

FOREIGN PATENT DOCUMENTS

| | | | |
|---|---|---|---|
| CN | 112554959 | A | 3/2021 |
| CN | 112943382 | A | 6/2021 |
| EP | 1681440 | A2 | 7/2006 |
| EP | 2378078 | A1 | 10/2011 |
| IN | 201641019895 | | 12/2017 |
| JP | 2015102236 | A | 6/2015 |

OTHER PUBLICATIONS

Ronald S. Bunker, "Axial Turbine Blade Tips: Function, Design, and Durability", Journal of Propulsion and Power, vol. 22, No. 2, Mar.-Apr. 2006, pp. 271-285.

China National Intellectual Property Administration, Notice of First Examination Opinion, Application No. 202310773487.6, dated May 18, 2026.

* cited by examiner

TURBINE ENGINE WITH A ROTATING BLADE HAVING A FIN

CROSS REFERENCE TO RELATED APPLICATIONS

This application is a continuation of U.S. patent application Ser. No. 17/859,456, filed Jul. 7, 2022, now allowed, which is hereby incorporated by reference in its entirety.

TECHNICAL FIELD

The disclosure generally relates to a gas turbine engine, and more specifically to a rotating blade of a gas turbine engine.

BACKGROUND

Turbine engines, and particularly gas turbine engines, are rotary engines that extract energy from a flow of working air passing serially through a compressor section, where the working air is compressed, a combustor section, where fuel is added to the working air and ignited, and a turbine section, where the combusted working air is expanded and work taken from the working air to drive the compressor section along with other systems, and provide thrust in an aircraft implementation. The compressor and turbine stages comprise axially arranged pairs of rotating blades and stationary vanes.

The gas turbine engine can be arranged as an engine core comprising at least a compressor section, a combustor section, and a turbine section in axial flow arrangement and defining at least one rotating element or rotor and at least one stationary component or stator. A seal assembly, specifically a labyrinth seal assembly, can be located between the stator and the rotor and be used to reduce leakage fluids between the rotor and stator. In a bypass turbofan implementation, an annular bypass air flow passage is formed about the core, with a fan section located axially upstream of the compressor section.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
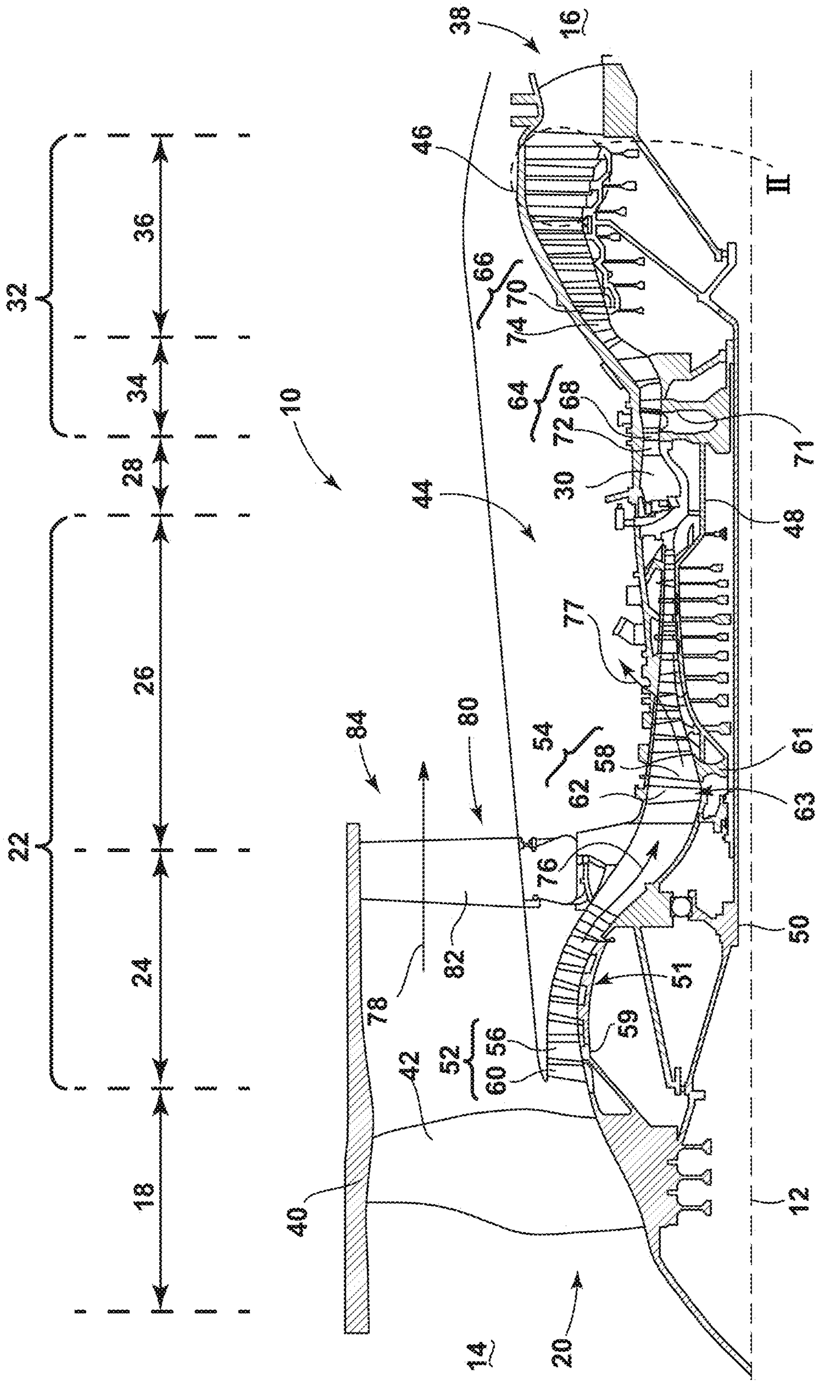
FIG. 1 is a schematic cross-sectional view of a gas turbine engine for an aircraft.

Aspects of the disclosure described herein are broadly directed to a gas turbine engine including an engine casing (a/k/a core casing) and a rotating blade. The rotating blade is spaced from the engine casing and to define a space therebetween. A fin can extend from the tip and extend into or otherwise define a portion of the space. The fin can have varying formations. As a non-limiting example, the fin can have a linear or non-linear contour, or be spaced from another fin to define a slot therebetween. As a non-limiting example, the fin can define a portion of an aft edge of the tip.

The fin can be used to direct and influence a flow of fluid within the space. The space that the fin is provided in is defined as a space that connects two regions of differing pressures (e.g., upstream and downstream of a rotating airfoil). The at least one fin can retard a flow of fluid from flowing around the airfoil and into the space by creating a labyrinth or tortuous flow path for the fluid within the space. The at least one fin can further be shaped such that it can direct the flow of fluid that flows into the space. As a non-limiting example, the fin can be used to retard the flow of fluid or otherwise direct the flow of fluid as it exits the space. For the purposes of illustration, one exemplary environment within which the fin can be utilized will be described in the form of a gas turbine engine. Such a gas turbine engine can be in the form of a gas turbine engine, a turboprop, turboshaft or a turbofan engine having a power gearbox, in non-limiting examples. It will be understood, however, that aspects of the disclosure described herein are not so limited and can have general applicability within engines or environments. For example, the disclosure can have applicability for a fin in other engines or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a gas turbine engine, radial refers to a direction along a ray extending between a center longitudinal axis of the engine and an outer engine circumference. Furthermore, as used herein, the term "set" or a "set" of elements can be any number of elements, including only one.

Further yet, as used herein, the term "fluid" or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be other suitable turbine engine such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine, specifically a gas turbine engine 10 for an aircraft. The gas turbine engine 10 has a generally longitudinally extending axis or engine centerline 12 extending forward 14 to aft 16. The gas turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38. The gas turbine engine 10 as described herein is meant as a non-limiting example, and other architectures are possible, such as, but not limited to, the steam turbine engine, the supercritical carbon dioxide turbine engine, or any other suitable turbine engine The fan section 18 includes a fan casing 40 surrounding the fan 20. The fan 20 includes a set of fan blades 42 disposed radially about the engine centerline 12. The HP compressor 26, the combustor 30, and the HP turbine 34 form an engine core 44 of the gas turbine engine 10, which generates combustion gases. The engine core 44 is surrounded by core casing 46, which can be coupled with the fan casing 40.

A HP shaft or spool 48 disposed coaxially about the engine centerline 12 of the gas turbine engine 10 drivingly connects the HP turbine 34 to the HP compressor 26. A LP shaft or spool 50, which is disposed coaxially about the engine centerline 12 of the gas turbine engine 10 within the larger diameter annular HP spool 48, drivingly connects the LP turbine 36 to the LP compressor 24 and fan 20. The spools 48, 50 are rotatable about the engine centerline 12 and couple to a set of rotatable elements, which can collectively define a rotor 51.

The LP compressor 24 and the HP compressor 26 respectively include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to a disk 61, which is mounted to the corresponding one of the HP and LP spools 48, 50, with each stage having its own disk 61. The static compressor vanes 60, 62 for a stage of the compressor can be mounted to the core casing 46 in a circumferential arrangement.

The HP turbine 34 and the LP turbine 36 respectively include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50, with each stage having a dedicated disk 71. The static turbine vanes 72, 74 for a stage of the compressor can be mounted to the core casing 46 in a circumferential arrangement.

Complementary to the rotor portion, the stationary portions of the gas turbine engine 10, such as the static compressor vanes 60, 62, and the static turbine 72, 74 among the compressor and turbine sections 22, 32 are also referred to individually or collectively as a stator 63. As such, the stator 63 can refer to the combination of non-rotating elements throughout the gas turbine engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the gas turbine engine 10 via the exhaust section 38. The driving of the LP turbine 36 drives the LP spool 50 to rotate the fan 20 and the LP compressor 24. The pressurized airflow 76 and the combustion gases can together define a working airflow that flows through the fan section 18, compressor section 22, combustion section 28, and turbine section 32 of the gas turbine engine 10.

A portion of the pressurized airflow 76 can be drawn from the compressor section 22 as bleed airflow 77. The bleed airflow 77 can be drawn from the pressurized airflow 76 and provided to engine components requiring cooling. The temperature of pressurized airflow 76 entering the combustor 30 is significantly increased. As such, cooling provided by the bleed airflow 77 is necessary for operating of such engine components in the heightened temperature environments.

A remaining portion of the airflow 77 bypasses the LP compressor 24 and engine core 44 and exits the gas turbine engine 10 through a stationary vane row, and more particularly an outlet guide vane assembly 80, comprising a set of airfoil guide vanes 82, at the fan exhaust side 84. More specifically, a circumferential row of radially extending airfoil guide vanes 82 are utilized adjacent the fan section 18 to exert some directional control of the airflow 77.

Some of the air supplied by the fan 20 can bypass the engine core 44 and be used for cooling of portions, especially hot portions, of the gas turbine engine 10, and/or used to cool or power other aspects of the aircraft. In the context of a gas turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
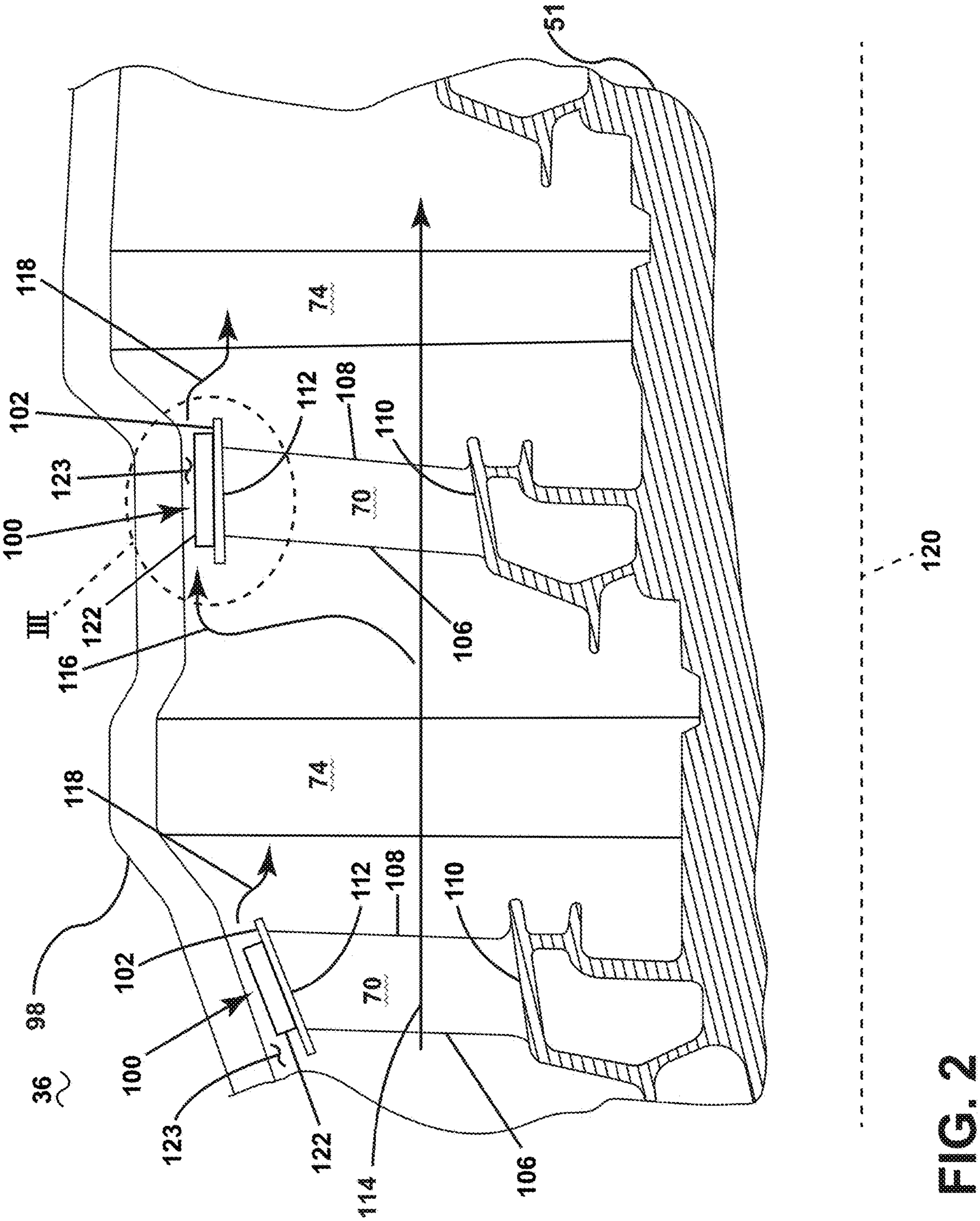
FIG. 2 is an enlarged portion of FIG. 1 from the area II, further illustrating a rotor and a stator, with a blade assembly operably coupled to the rotor and having a fin extending from a tip of the blade.

FIG. 2 is an enlarged schematic sectional view as seen from area II of FIG. 1. FIG. 2 further illustrates the rotor 51, an engine casing 98 (a/k/a core casing), and a blade assembly 100 including the turbine blade 70 of FIG. 1. The turbine blade 70 can extend between a root 110 and a tip 112 in a spanwise direction and between an airfoil leading edge 106 and an airfoil trailing edge 108 in a chordwise direction. A tip platform 102 can be operably coupled to or integrally formed with the tip 112. The tip platform 102 can be radially spaced inwardly from the engine casing 98 to define a space 123 therebetween. At least one fin 122 can extend from the tip 112 and into the space 123. The blade assembly 100 can be provided within the LP turbine 36. While described in terms of being provided within the LP turbine 36, it will be appreciated, however, that the aspects of the blade assembly 100 as described herein can be applied to any suitable rotating assembly including a rotating airfoil within any turbine engine or portion of the gas turbine engine 10. Further, it will be appreciated that the at least one fin 122 can be radially spaced from any suitable rotating or non-rotating component. As a non-limiting example, the at least on fin 122 can be radially spaced from the rotor 51, another rotor, or the stator 63.

The turbine blade 68 rotates about a rotational axis 120. The rotational axis 120 can coincide with, be offset from, or be non-parallel to the engine centerline 12. The turbine blade 70 can extend between the airfoil leading edge 106 and the airfoil trailing edge 108 to define a chordwise direction. The turbine blade 70 can extend between the root 110 and the tip 112 to define a spanwise direction. The tip 112 can be spaced radially outwardly or radially inwardly from the root 110 with respect to the rotational axis 120.

The tip platform 102 can extend continuously or in a segmented arrangement circumferentially about the rotational axis 120. As a non-limiting example, the tip platform 102 can be segmented such that it includes multiple discrete platforms coupled to one another or abutting one another that together form the annulus. The turbine blade 70 can be included within an annular array of turbine blades 70, each including a respective tip 112 that is operably coupled to or otherwise integrally formed with a respective circumferential portion of the tip platform 102.

The fin 122 can extend from the tip 112 (e.g., the tip platform 102 is removed) or otherwise extend from the tip platform 102. The fin 122 can be coupled to or integrally formed with the tip 112 or the tip platform 102. The fin 122 can be included within an annular array of fins 122 that are coupled to respective circumferential portions of the tip platform 102 or tip(s) 112. There can be any number of one or more fins 122 along the blade assembly 100. The fin 122 can extend in at least one of the radial, circumferential, or axial direction and be formed along any suitable portion of the tip platform 102 or tip(s) 112. The at least one fin 122 can be included within a circumferential array of fins 122. Each fin 122 of the circumferential array of fins 122 can be identical. Alternatively, one or more fins 122 can be non-identical to another fin 122.

During operation of the gas turbine engine 10, a working airflow 114 flows over the turbine blades 70 and static turbine vanes 74. At least a portion of the working airflow 114 can diverge from a mainstream flow path (e.g., a flow path area including the turbine blades 70 and static turbine vanes 74) and flow within the space 123 as a leakage airflow. As illustrated, the leakage airflow can include a first leakage airflow 116 that flows into the space 123 and a second leakage airflow 118 that flows out of the space 123. The second leakage airflow 118 can merge with the working airflow 114 downstream of the airfoil trailing edge 108 of the turbine blade 70, which can subsequently flow over a downstream airfoil (e.g., a downstream static turbine vane 74).

Figure 3:
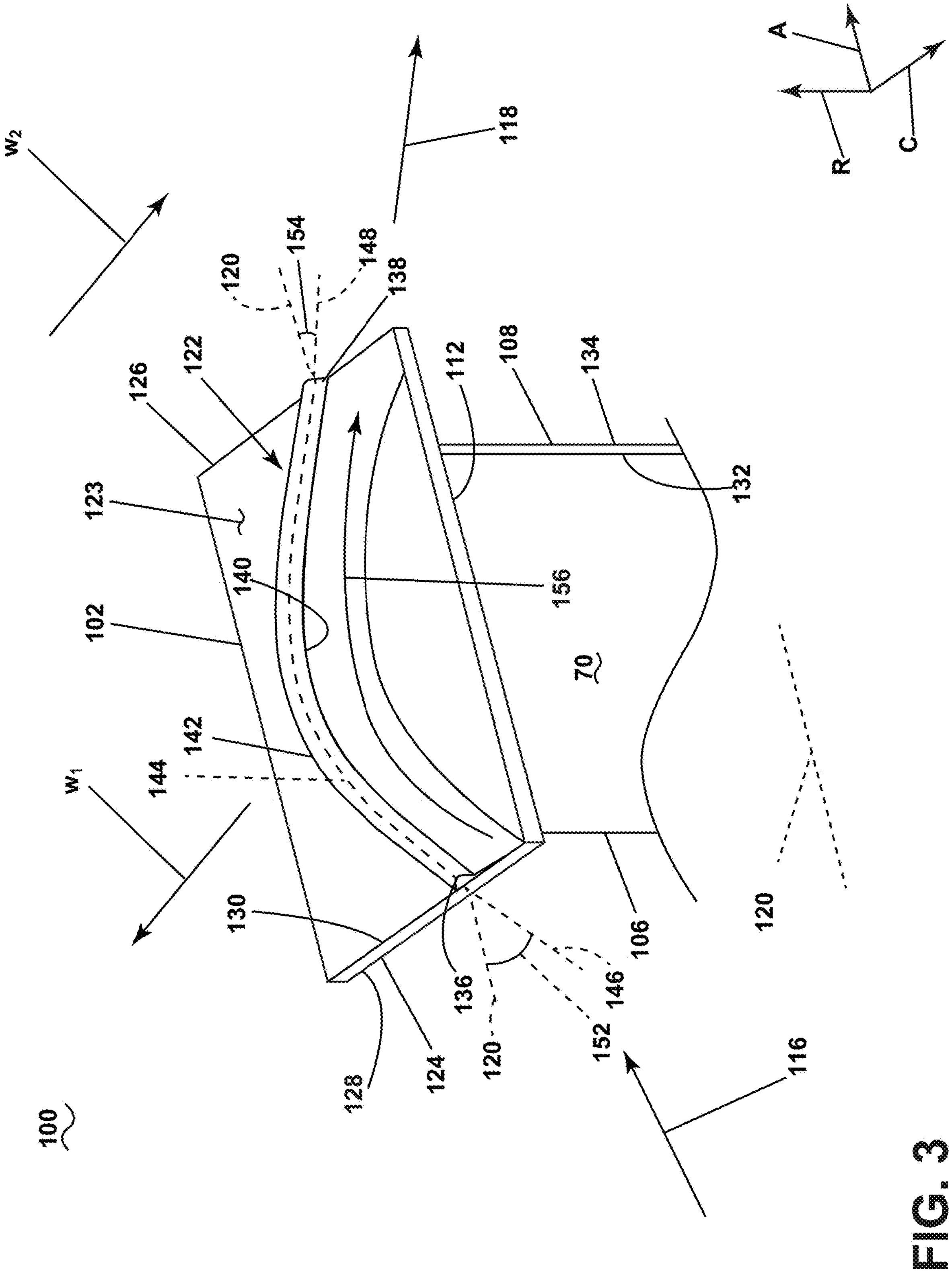
FIG. 3 is a schematic top-down perspective view of the blade assembly in area III of FIG. 2, further illustrating a non-linear contour of the fin.

FIG. 3 is a schematic top-down perspective view of the blade assembly 100 as seen in the area III of FIG. 2. The blade assembly 100, as illustrated, is removed from the engine casing 98 for clarity.

The blade assembly 100 can include the turbine blade 70, which as described herein, can be any suitable rotating blade or airfoil configured to rotate about a rotational axis 120. The tip platform 102 can extend axially in an axial direction (A) between a fore edge 124 and an aft edge 126 and radially between a first surface 128 and a second surface 130, with respect to the rotational axis 120. The first surface 128 can be spaced radially inwardly from the second surface 130.

The fin 122 can extend radially outward in a radial direction (R) from the second surface 130 and into the space 123, with respect to the rotational axis 120. The fin 122 can extend between a leading edge 136 and a trailing edge 138. The leading edge 136 can be provided at or axially downstream of the fore edge 124. The trailing edge 138 can be provided at or axially upstream of the aft edge 126. The fin 122 can include a mean camber line 144 extending between the leading edge 136 and the trailing edge 138. The mean camber line 144 can extend non-linearly between the leading edge 136 and the trailing edge 138 to define a contour of the fin 122. As such, the fin 122 can include a pressure side 140 and a suction side 142. As a non-limiting example, the contour can be an airfoil contour. It will be appreciated, however, that the fin 122 can include any suitable non-linear contour such as, but not limited to, a step contour, a wave contour, a sinusoidal control, or the like. The fin 122, as illustrated, swoops in a circumferential direction (C). As such, the fin 122 includes a circumferential contour.

The turbine blade 70 can include an airfoil pressure side 132 and an airfoil suction side 134. The airfoil pressure side 132 and the airfoil suction side 134 can coincide with or be opposite the pressure side 140 and the suction side 142, respectively, of the fin 122. The fin 122 can be a mirror of the turbine blade 70 as seen from a vertical plane extending along the rotational axis 120 and intersecting a point radially halfway between the tip 112 and where the fin 122 meets the tip platform 102 or the tip 112. The fin 122 can coincide circumferentially with the turbine blade 70. As a non-limiting example, the fin 122 can include an airfoil cross section. As a non-limiting example, the fin 122 can be a radial projection of the turbine blade 70 through the tip 112 and the tip platform 102.

The mean camber line 144 intersects the leading edge 136 at a leading edge intersection. A first straight line 146, parallel to the mean camber line 144 at the leading edge intersection, can be drawn extending from the leading edge 136 of the fin 122. A first included angle 152 is formed between the first straight line 146 and the rotational axis 120 (shown as a projection near the first straight line 146).

The mean camber line 144 intersects the trailing edge 138 at a trailing edge intersection. A second straight line 148, parallel to the mean camber line 144 at the trailing edge intersection, can be drawn extending from the trailing edge 138 of the fin 122. A second included angle 154 is formed between the second straight line 148 and the rotational axis 120 (shown as a projection near the second straight line 148).

It will be appreciated that the turbine blade 70, like the fin 122, is defined by a mean camber line (not illustrated). An airfoil first included angle is measured between the men camber line of the turbine blade 70 and the rotational axis 120 at the airfoil leading edge. An airfoil second included angle is measured between the men camber line of the turbine blade 70 and the rotational axis 120 at the airfoil trailing edge 108. The first included angle 152 and the second included angle 154 can be equal to, smaller than, or larger than the airfoil first included angle and the airfoil second included angle, respectively, at the tip 112 of the turbine blade 70. As a non-limiting example, the first included angle 152 can be within a range of the airfoil first included angle of plus or minus 25 degrees. As a non-limiting example, the second included angle 154 can be within a range of the airfoil second included angle of plus or minus 25 degrees. A magnitude of the first included angle 152 can be equal to or non-equal to the magnitude second included angle 154.

During operation of the gas turbine engine 10 (e.g., during rotation of the blade assembly 100), the first leakage airflow 116 can flow into the space 123. As the first leakage airflow 116 flows into the space 123, it impinges the leading edge 136 of the fin 122 and follows the contour of the fin 122 as a third leakage airflow 156. It is contemplated that the first included angle 152 can be sized such that it is parallel with the first leakage airflow 116. The third leakage airflow 156 can exit the space 123 as the second leakage airflow 118 and ultimately merge with the working airflow 114 downstream of the turbine blade 70. The first leakage airflow 116, the second leakage airflow 118 and the third leakage airflow 156 will be collectively referred to as "the leakage airflow".

The blade assembly 100 rotates in a first circumferential direction ($w_1$) with respect to the rotational axis 120. The working airflow 114 that flows against an upstream portion of the blade assembly 100 includes a circumferential component in the first circumferential direction ($w_1$). As the working airflow 114 flows over the turbine blade 70, the turbine blade 70 redirects the working airflow 114 such that the circumferential component of the working airflow downstream of the blade assembly 100 is in a second circumferential direction ($w_2$) opposing or otherwise opposite the first circumferential direction ($w_1$).

It is contemplated that redirecting the leakage airflow via the at least one fin 122 such that its circumferential component is in line with the circumferential component (e.g., the second circumferential direction ($w_2$)) results in a reduction of aerodynamic losses associated with the leakage airflow merging with the working airflow 114 downstream of the blade assembly 100. Further, the fin 122 can be used to redirect the leakage airflow such that it is in-line with a portion of the gas turbine engine 10 downstream of the turbine blade 70. As a non-limiting example, the fin 122 can be used to redirect the leakage airflow such that it is in-line with a leading edge of a downstream airfoil (e.g., the static turbine vane 74). The redirection of the leakage airflow minimizes losses associated with a non-aligned airflow flowing against the downstream airfoil. The minimization or reduction of losses ultimately results in a gas turbine engine with a greater efficiency when compared to a gas turbine engine without the fin 122 as described herein.

The fin 122 is further sized to minimize the amount of leakage airflow when compared to a blade assembly without the fin 122. As a non-limiting example, the fin 122 creates a tortuous path within the space 123 such that the leakage airflow is at least partially blocked from flowing through the space 123. The minimization of the amount of leakage airflow means more air is dedicated to the working airflow 114 rather than the leakage airflow. The more air within the working airflow 114, the more torque that is extracted as the working airflow 114 flows over the turbine blades 70. This ultimately results in a more efficient gas turbine engine 10 with a higher torque or thrust output when compared to a gas turbine engine without the fin 122.

The fin 122 adds to the overall torque of the blade assembly 100. As the fin 122 includes the circumferential contour, the fin 122 acts as an additional portion of the airfoil or blade that extracts work in the form of torque from the leakage airflow as it flows over the surface of the fin 122. This, in turn, results in a gas turbine engine with a higher torque output and therefore a more efficient gas turbine engine when compared to a gas turbine engine without the fin 122.

Figure 4:
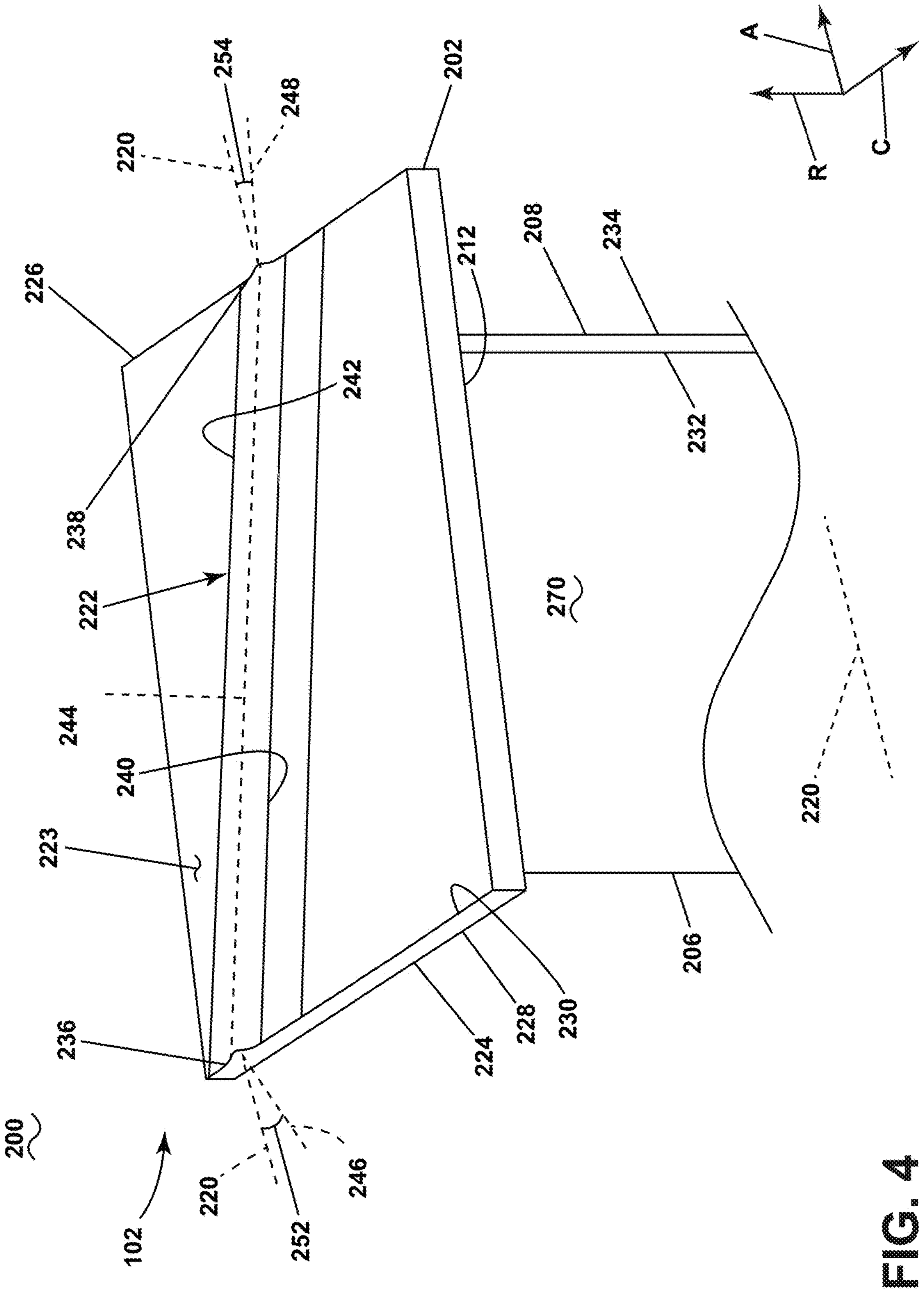
FIG. 4 is a schematic top-down perspective view of an exemplary blade assembly suitable for use as the blade assembly of FIG. 2, further illustrating an exemplary fin having a linear contour.

FIG. 4 is a schematic top-down perspective view of an exemplary blade assembly 200 suitable for use as the blade assembly 100 of FIG. 2. The blade assembly 200 is similar to the blade assembly 100. Therefore, like parts will be identified with like numerals increased to the 200 series, with it being understood that the description of the like parts of the blade assembly 100 applies to the blade assembly 200 unless otherwise noted.

The blade assembly 200 includes an airfoil 270 (e.g., the turbine blade 70) extending between a root (not illustrated) and a tip 212, and a leading edge 206 and a trailing edge 208. The airfoil 270 can be any suitable airfoil configured to rotate about a rotational axis 220. A tip platform 202 can be integrally formed with or operably coupled to the tip 212. The tip platform 202 can extend axially between a fore edge 224 and an aft edge 226, and radially between a first surface 228 and a second surface 230, with respect to the rotational axis 220. The tip platform 202 and the tip 212 can be radially spaced from an engine casing (not illustrated) to define a space 223 therebetween. A fin 222 can extend radially from the tip 212, with respect to the rotational axis 220. As a non-limiting example, the fin 222 can extend radially from the tip platform 202 and be operably coupled to or integrally formed with the tip platform 202. The fin 222 can extend between a leading edge 236 at or downstream of the fore edge 224 and a trailing edge 238 at or upstream of the aft edge 226. A mean camber line 244 can extend between the leading edge 236 and the trailing edge 238. The mean camber line 244 intersects the leading edge 236 at a leading edge intersection and form a first included angle 252 between a first straight line 246 parallel to the mean camber line 244 at the leading edge intersection and the rotational axis 220. The mean camber line 244 can intersect the trailing edge 238 at a trailing edge intersection and form a second included angle 254 between a second straight line 248 parallel to the mean camber line 244 at the trailing edge intersection and the rotational axis 220. The fin 222 can be defined by a pressure side 240 and a suction side 242. The airfoil 270 can be defined by an airfoil pressure side 232 and an airfoil suction side 234. The airfoil pressure side 232 and the airfoil suction side 234 can coincide with the pressure side 240 and suction side 242, respectively. The fin 222 can be contoured in the axial and circumferential direction with respect to the rotational axis 220.

The blade assembly 200 is similar to the blade assembly 100, however, the mean camber line 244 extends linearly. As such, the fin 222 has a linear contour. As such, the first included angle 252 can be equal to the second included angle 254. The fin 222, like the fin 122, includes a circumferential contour as the fin 222 includes a mean camber line 244 that extends linearly in the circumferential and axial directions.

Figure 5:
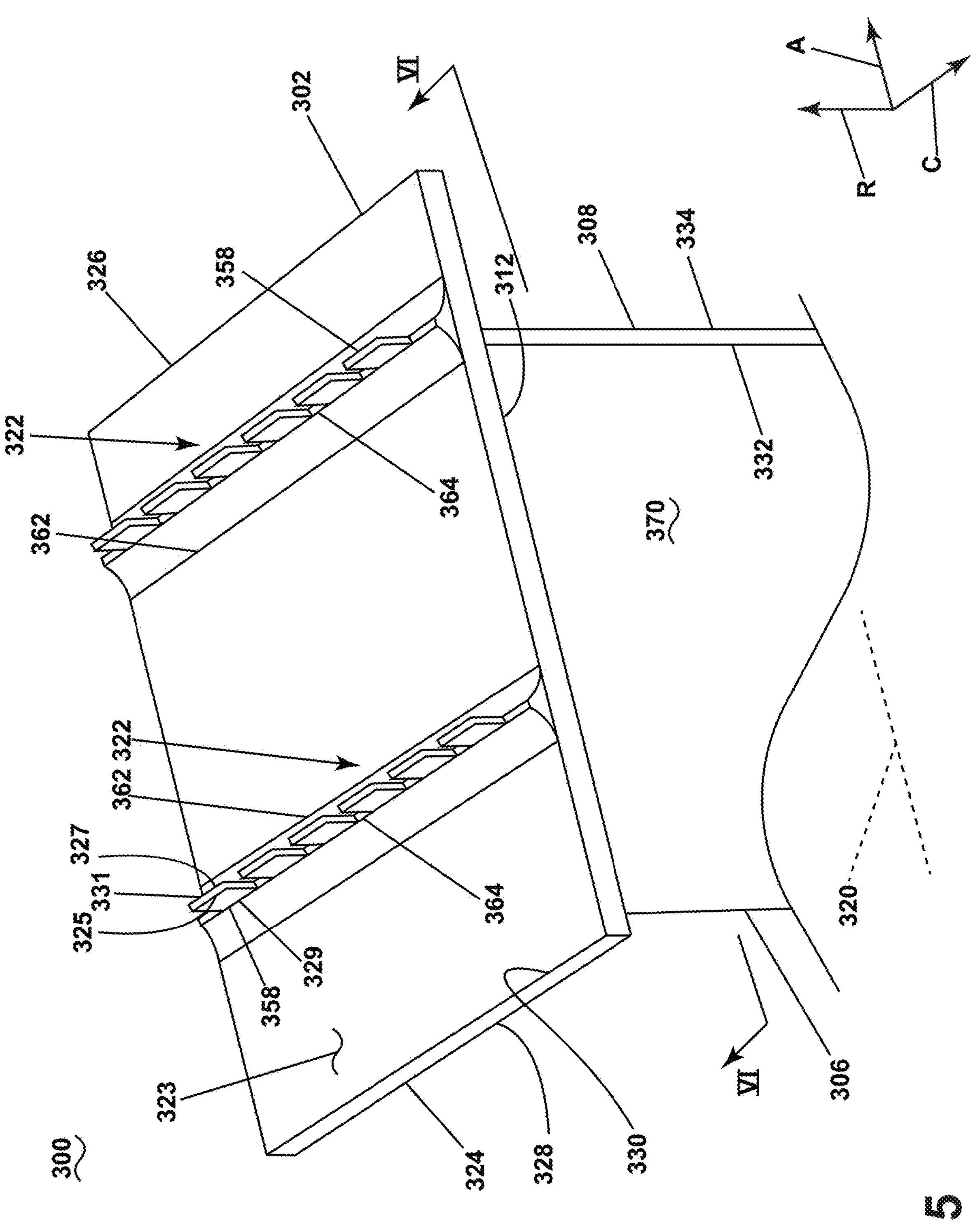
FIG. 5 is a schematic top-down perspective view of an exemplary blade assembly suitable for use as the blade assembly of FIG. 2, further illustrating a plurality of first fins and a plurality of second fins, with each including a plurality of spaced slots.

FIG. 5 is a schematic top-down perspective view of an exemplary blade assembly 300 suitable for use as the blade assembly 100 of FIG. 2. The blade assembly 300 is similar to the blade assembly 100, 200. Therefore, like parts will be identified with like numerals increased to the 300 series, with it being understood that the description of the like parts of the blade assembly 100, 200 applies to the blade assembly 300 unless otherwise noted.

The blade assembly 300 includes an airfoil 370 (e.g., the turbine blade 70) extending between a root (not illustrated) and a tip 312, and a leading edge 306 and a trailing edge 308. The airfoil 370 can be defined by an airfoil pressure side 332 and an airfoil suction side 334. The airfoil 370 can be any suitable airfoil configured to rotate about a rotational axis 320. A tip platform 302 can be integrally formed with or operably coupled to the tip 312. The tip platform 302 can extend axially between a fore edge 324 and an aft edge 326, and radially between a first surface 328 and a second surface 330, with respect to the rotational axis 320. The tip platform 302 and the tip 312 can be radially spaced from an engine casing (not illustrated) to define a space 323 therebetween. At least one fin 322 can extend radially from the tip 312.

The blade assembly 300 is similar to the blade assembly 100, 200, however, the blade assembly 300 include at least two fins 322. The at least two fins 322 can each include a plurality of tabs 358 that are circumferentially spaced from one another. Each two circumferentially adjacent tabs 358 can define a slot 364 therebetween. As such, the at least two fins 322 can be contoured in the circumferential direction with respect to the rotational axis 320. The tabs 358 and the slots 364 form a circumferential contour of the respective fin 322.

Each tab 358 of the plurality of tabs 358 can extend as a rectangular tab extending radially outwardly from the tip platform 302. The tab 358 can extend between a front face 325 and a rear face 327 in the axial direction and between a root 329 and a tip 331 in the radial direction. The front face 325 can be perpendicular or non-perpendicular to the leakage airflow or otherwise extends in the circumferential direction with respect to the rotational axis 320. The front face 325 and the rear face 327 can extend each normal to the second surface 330 of the tip platform 302. The at least two fins 322 can each include a fillet 362 or a filleted edge that extends from the root 329 of a respective fin 322 and to the second surface 330 of the tip platform 302. Alternatively, the root 329 can be directly coupled to the tip platform 302.

As a non-limiting example, the blade assembly 300 can include two fins 322. Alternatively, the blade assembly 300 can include any number of one or more fins 322. As illustrated, the at least two fins 322 can include an upstream fin 322 and a downstream fin 322 axially downstream of the upstream fin 322 with respect to the rotational axis 320. The at least two fins 322 each include a plurality of slots 364. At least one of the at least two fins 322 can extend circumferentially about an entirety of the rotational axis 320. As such, the at least two fins 322 can each define an annular array of circumferentially alternating slots 364 and tabs 358 when viewed along a radial plan intersecting a respective fin 322 of the at least two fins 322.

The downstream fin 322 can be a mirror image of or formed differently from the upstream fin 322, however, axially spaced downstream of the upstream fin 322. As a non-limiting example, the at least two fins 322 can be circumferentially aligned such that the slots 364 are circumferentially aligned. Alternatively, the at least two fins 322 can be circumferentially unaligned such that the slots 364 of one of the at least two fins 322 is circumferentially aligned with at least a portion of a tab 358 of an other of the at least two fins 322.

As a non-limiting example, one of the two fins 322 can be larger than the other. As a non-limiting example, both fins 322 can be defined by a height in the radial direction with respect to the rotational axis 320. A first fin 322 can include a first height, while a second fin can include a second height larger than or smaller than the second height. As a non-limiting example, the height of the second fin 322 can be 0.8 to 1.2 times the height of the first fin 322.

During operation, at least a portion of the leakage airflow flows through the slots 364. As such, the slots 364 is used to permit or otherwise control a flow of the leakage airflow. The slots 364 are positioned and sized such that it can be controlled where the leakage airflow flows within the space 323. This control of the leakage airflow allows for the leakage airflow to be redirected and at least partially blocked similar to the fins 122, 222. Further, the slots 364 and fins 322 can be used to create a tortuous path for the leakage airflow through the creation of a labyrinth within the space 323.

Figure 6:
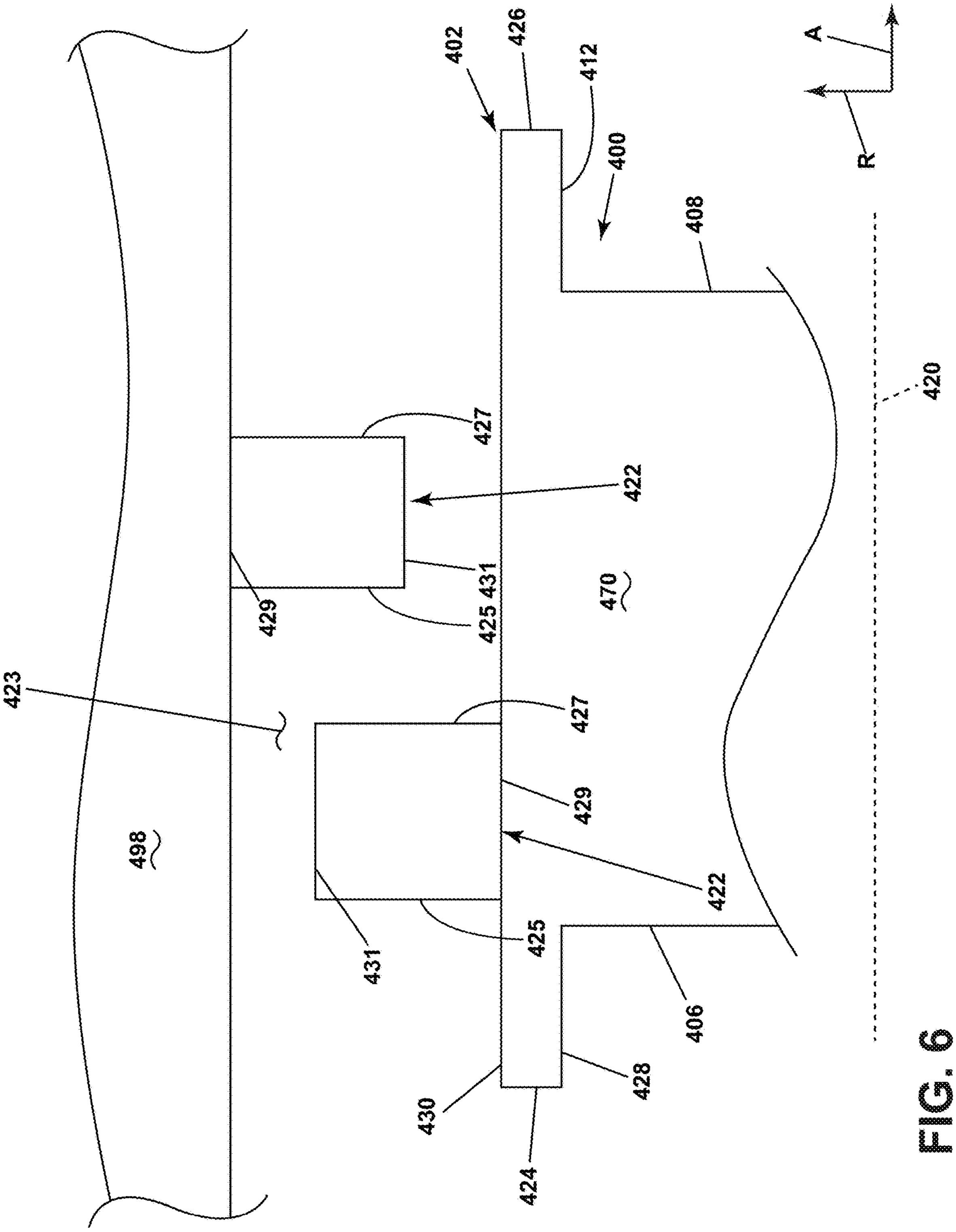
FIG. 6 is a schematic side view of an exemplary blade assembly as seen from sight line VI-VI of FIG. 5 and suitable for use as the blade assembly of FIG. 2, further comprising a first fin extending from the tip and a second fin extending from a core casing.

FIG. 6 is a schematic side of an exemplary blade assembly 400 suitable for use as the blade assembly 100 of FIG. 2. The blade assembly 400 is similar to the blade assembly 100, 200, 300. Therefore, like parts will be identified with like numerals increased to the 400 series, with it being understood that the description of the like parts of the blade assembly 100, 200, 300 applies to the blade assembly 400 unless otherwise noted.

The blade assembly 400 includes an airfoil 470 (e.g., the turbine blade 70) extending between a root (not illustrated) and a tip 412, and a leading edge 406 and a trailing edge 408. The airfoil 470 can be any suitable airfoil configured to rotate about a rotational axis 420. A tip platform 402 can be integrally formed with or operably coupled to the tip 412. The tip platform 402 can extend axially between a fore edge 424 and an aft edge 426, and radially between a first surface 428 and a second surface 430, with respect to the rotational axis 420. The tip platform 402 and the tip 412 can be radially spaced from an engine casing 498 to define a space 423 therebetween. At least one fin 422 can extend radially from the tip 412 with respect to the rotational axis 420.

The blade assembly 400 is similar to the blade assembly 300, in that it includes at least two fins 422 axially spaced from one another. It will be appreciated that the blade assembly 400, like the blade assembly 300, can include a plurality of tabs 358 and a plurality of slots (not illustrated) Alternatively, the blade assembly 400 can include two fins 422. Each fin 422 can extend between a forward face 425 and a rear face 427 in the axial direction and between a root 429 and a tip 431 in the radial direction.

At least one fin 422 can extend from the engine casing 498 such that the root 429 of the at least one fin 422 is directly coupled to a portion of the engine casing 498 and the tip 431 is radially spaced from the second surface 430 of the tip platform 402. Alternatively, both or any number of fins 422 can extend from the engine casing 498. As illustrated, the downstream fin 422 extends from the engine casing 498, however, it will be appreciated that the upstream fin 422 can extend from the engine casing 498 while the downstream fin 422 extends from the tip platform 402.

It will be further appreciated that while described in terms of the blade assembly 400 having the at least one fin 422 extending from the engine casing 498 that any of the blade assemblies 100, 200 described herein can include the fin 122, 222 extending from the engine casing 498. In other words, the fin 122, 222, 322, 422, as described herein, can extend radially from the tip 112, 212, 312, 412, 712, the tip platform 102, 202, 302, 402, 702, or the engine casing 98, 498. In any case, the fin 122, 222, 322, 422, can be defined as an element extending radially with respect to the tip 112, 212, 312, 412, 712.

The placement of at least one of the at least one fin 422 to extend from the engine casing 498 provides blockage (e.g., through the creation of a tortuous path or labyrinth) and redirects the leakage airflow within the space 423 Placing the at least one fin 422 on the engine casing 498 further increases the efficiency of the rotating blade assembly 400 by reducing the weight of the rotating portions of the rotating blade assembly 400 (e.g., the airfoil 470, the tip platform 402, etc.). This lowers the force required to rotate the rotating portions of the blade assembly 400 as compared to the blade assembly 400 where all fins 422 are provided on the tip platform 402. As used herein, the at least one fin 422 extending from the engine casing 498 is still a portion of the blade assembly 400, however, is further defined as a stationary portion of the blade assembly 400.

Figure 7:
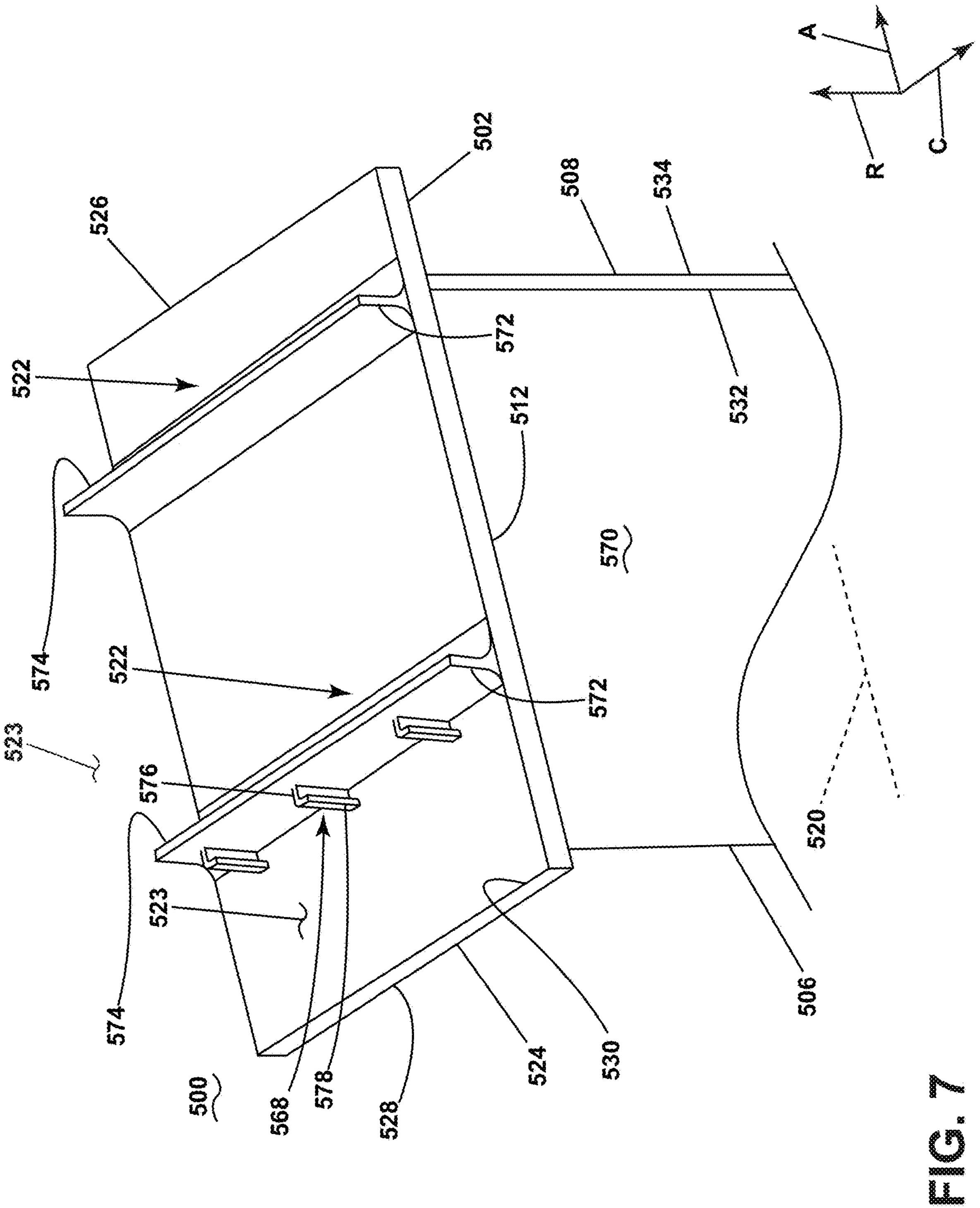
FIG. 7 is a schematic top-down perspective view of an exemplary blade assembly suitable for use as the blade assembly of FIG. 2, further illustrating a fin including a projection projecting axially away from a remainder of the fin.

FIG. 7 is a schematic top-down perspective view of an exemplary blade assembly 500 suitable for use as the blade assembly 100 of FIG. 2. The blade assembly 500 is similar to the blade assembly 100, 200, 300, 400. Therefore, like parts will be identified with like numerals increased to the 500 series, with it being understood that the description of the like parts of the blade assembly 100, 200, 300, 400 applies to the blade assembly 500 unless otherwise noted.

The blade assembly 500 includes an airfoil 570 (e.g., the turbine blade 70) extending between a root (not illustrated) and a tip 512, and a leading edge 506 and a trailing edge 508. The airfoil 570 can be defined by an airfoil pressure side 532 and an airfoil suction side 534. The airfoil 570 can be any suitable airfoil configured to rotate about a rotational axis 520. A tip platform 502 can be integrally formed with or operably coupled to the tip 512. The tip platform 502 can extend axially between a fore edge 524 and an aft edge 526, and radially between a first surface 528 and a second surface 530, with respect to the rotational axis 520. The tip platform 502 and the tip 512 can be radially spaced from an engine casing (not illustrated) to define a space 523 therebetween. At least one fin 522 can extend radially from the tip 512 with respect to the rotational axis 520.

The blade assembly 500 is similar to the blade assembly 100, 200, 300, 400. However, the blade assembly 500 includes at least two fins 522 extending radially outward from a respective portion of the tip 512 with respect to the rotational axis 520. While described in terms of the at least two fins 522, it will be appreciated that aspects of the blade assembly 500 can be applied to a blade assembly having at least one fin. Each fin of the at least two fins 522 includes a forward wall 572 and an aft wall 574 axially spaced downstream of the forward wall 572.

The at least one projection 568 extends from a and is integrally formed with or coupled to a respective portion of at least one of the at least two fins 522. As a non-limiting example, the at least one projection 568 can extend axially outward from the forward wall 572, with respect to the rotational axis 520.

The at least one projection 568 can be any suitable shape such that the at least one projection 568 extends axially away from a respective fin 522 of the at least two fins 522, with respect to the rotational axis 520. The at least one projection 568 can include a first leg 576 and a second leg 578. The first leg 576 can be provided on the forward wall 572 and extends axially outward from the forward wall 572. The second leg 578 extends from an end of the first leg 576 opposite where the first leg 576 meets the forward wall 572. The second leg 578 extends non-parallel to or parallel to the first leg 576 when viewed along a vertical plane extending along the rotational axis 520 and intersecting the at least one projection 568. As a non-limiting example, the second leg 578 can be normal to the first leg 576 such that the second leg 578 extends circumferentially from the first leg 576, with respect to the rotational axis 520. As such, the at least one projection 568 can form a hook or an L-shaped cross-section when viewed along the vertical plane. As at least a portion of the at least one projection 568 extends circumferentially, the at least one projection 568 forms a circumferential contour of the fin 522.

The blade assembly 500 can include two fins 522 that are axially spaced from one another. As illustrated, only a single fin 522 of the at least two fins 522 includes the at least one projection 568. As a non-limiting example, only the upstream fin 522 of the at least two fins 522 includes the at least one projection 568. As illustrated, the at least one fin 522 can include a plurality of projections 568. As a non-limiting example, the at least one fin 522 can include a series of circumferentially spaced projections 568, with each projection 568 extending from a respective portion of the respective fin 522.

During operation, the projection 568 of the at least one fin 522 is used to minimize the leakage flow by altering the direction of the leakage fluid within the space 523. As the leakage flow flows over the projection 568, the projection 568 further extracts at least some torque from the leakage airflow which is added to the overall torque of the blade assembly 500. The projection 568 further tweaks the tangential (e.g., circumferential) component of the leakage airflow to minimize the effects of the leakage airflow when it merges with the working airflow downstream of the blade assembly 500. In other words, the projection 568 minimizes the aerodynamic losses.

Figure 8:
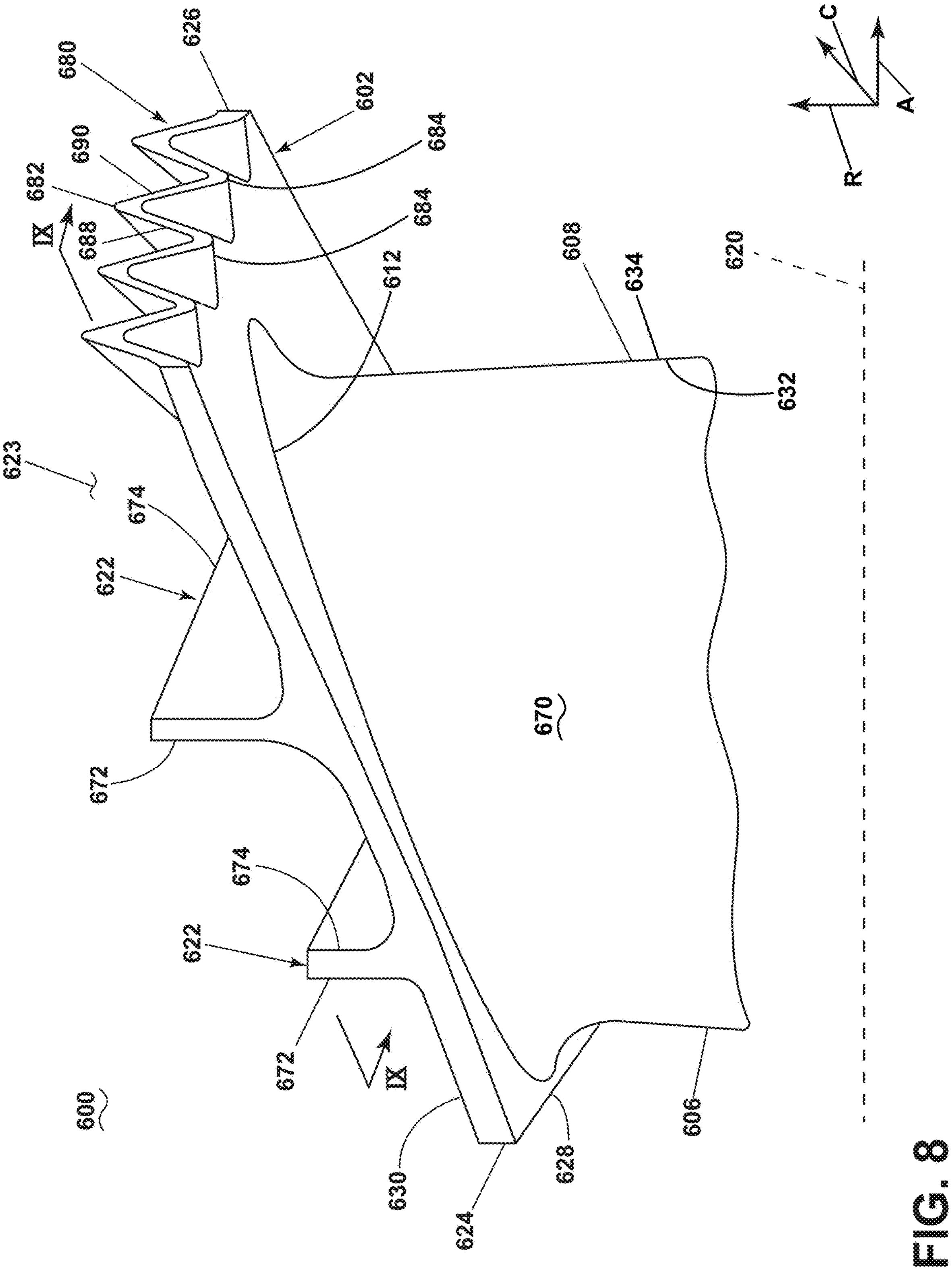
FIG. 8 is a schematic top-down perspective view of an exemplary blade assembly suitable for use as the blade assembly of FIG. 2, further illustrating a contoured aft edge of the tip, the contoured aft edge having a wave formation.

FIG. 8 is a schematic bottom-up perspective view of an exemplary blade assembly 600 suitable for use as the blade assembly 100 of FIG. 2. The blade assembly 600 is similar to the blade assembly 100, 200, 300, 400, 500. Therefore, like parts will be identified with like numerals increased to the 600 series, with it being understood that the description of the like parts of the blade assembly 100, 200, 300, 400, 500 applies to the blade assembly 600 unless otherwise noted.

The blade assembly 600 includes an airfoil 670 (e.g., the turbine blade 70) extending between a root (not illustrated) and a tip 612, and a leading edge 606 and a trailing edge 608. The airfoil 670 can be defined by an airfoil pressure side 632 and an airfoil suction side 634. The airfoil 670 can be any suitable airfoil configured to rotate about a rotational axis 620. A tip platform 602 can be integrally formed with or operably coupled to the tip 612. The tip platform 602 can extend axially between a fore edge 624 and an aft edge 626, and radially between a first surface 628 and a second surface 630, with respect to the rotational axis 620. The tip platform 602 and the tip 612 can be radially spaced from an engine casing (not illustrated) to define a space 623 therebetween. At least one fin 622 can extend radially from the tip platform 602 and into the space 623. The at least one fin 622, as illustrated, can extend circumferentially about the rotational axis 620 in a non-contoured fashion. In other words, the at least one fin 622 is not contoured in the circumferential or axial direction. The at least one fin 622 can include at least two fins 622 axially spaced from one another. The at least one fin 622 can include a forward wall 672 and a rear wall 674 can extend radially from the second surface 630.

The aft edge 626 of the tip platform 602 is contoured in the radial and circumferential directions. The aft edge 626 includes a set of projections 680 extending radially from an upstream portion of the tip platform 602 with respect to the set of projections 680. Each projection 680 includes a peak 682, a valley 684, a first leg 688 and a second leg 690. The first leg 688 interconnects the peak 682 and the valley 684. The second leg 690 interconnects the peak 682 and an adjacent valley 684 of an adjacent projection 680. The peak 682 is radially spaced from the valley 684, with respect to the rotational axis 620. The peak 682 defines a radially outer portion of the projection 680. The valley 684 defines a radially inward portion of the projection 680. The set of projections 680, with alternating peaks 682 and valleys 684, defines a radial wave formation along the aft edge 626. The wave formation of the set of projections 680 can be a smooth wave (e.g., a sinusoidal wave) or a triangular wave (e.g., a W-shape). In other words, the first leg 688 and the second leg 690 extend linearly or non-linearly between respective peaks 682 and valleys 684.

As illustrated, the first leg 688 and the second leg 690 extend at the same angle with respect to a vertical plane extending along the rotational axis and intersecting the peak 682. In other words, the first leg 688 is a mirror image of the second leg 690 with respect to the vertical plane. It will be appreciated, however, that the first leg 688 can extend at an angle non-equal to an angle that the second leg 690 extends at. The first leg 688 can be longer than or shorter than the second leg 690. In other words, the first leg 688 is not a mirror image of the second leg 690 with respect to the vertical plane). In other words, the projection 680 extends circumferentially about the rotational axis in a non-uniform fashion or uniform fashion.

There can be any number of one or more projections 680 provided along the aft edge 626. As a non-limiting example, the set of projections 680 can include a total of 1 to 15 total projections.

The set of projections 680 can extend across any suitable portion of the aft edge 626. As a non-limiting example, the set of projections 680 can extend segmented or in a continuous fashion about an entirety of or a portion of the rotational axis 620.

As the wave formation extends in the radial direction, the aft edge 626 include a radial contour. The radially contoured aft edge 626 is used to redirect the leakage flow as it flows from the space 623. As a non-limiting example, the contoured aft edge 626 including the set of projections 680 redirects the flow of the leakage fluid to minimize the mixing or aerodynamic losses associated with the leakage flow merging with the working airflow downstream of the blade assembly 600.

Figure 9:
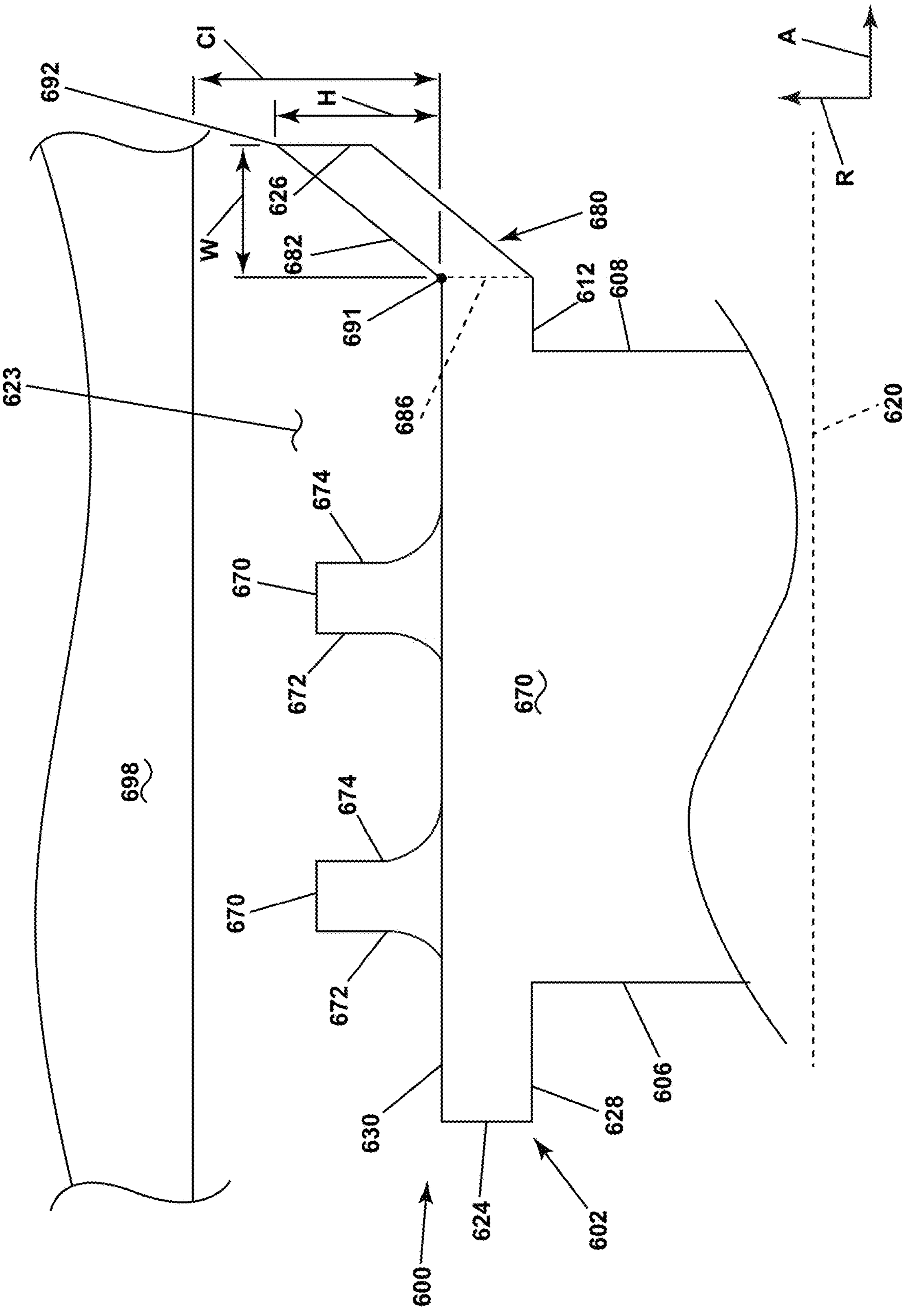
FIG. 9 is a schematic side view of the blade assembly as seen from sight line IX-IX of FIG. 8, further illustrating a height and width of the contoured aft edge.

FIG. 9 is a schematic side view of the blade assembly 600 of FIG. 8 as seen sight line IX-IX, which intersects the projection 680 along the peak 682. A separation line 686 has been drawn for purposes of illustration to show where the projection 680 is defined. The separation line 686 is a non-limiting line and is used for illustrative purposes only.

The peak 682 extends radially outward from the second surface 630 of the tip platform 602 and is spaced from an engine casing 698. As illustrated, the peak 682 extends linearly from the second surface 630 and to an apex 692 of the peak 682. It will be appreciated that the entire surface between the apex 692 and the second surface 630 is the peak 682. The peak 682 can extend linearly or non-linearly from the second surface 630 to the apex 692. While the peak 682 is shown, it will be appreciated that the valley 684 can have a similar formation but in the opposite direction. Further, it will be appreciated that the valley 684 can correspond to the first surface 628 of be provided radially inward from the first surface 628 with respect to the rotational axis 620.

Each projection 680 includes a width (W) and a height (H). The width (W) is the axial distance, with respect to the rotational axis 620, between an intersection point 691 where the separation line 686 intersects the second surface 630 (e.g., an axially forwardmost point of the peak 682) and the apex 692. The height (H) is the radial distance, with respect to the rotational axis 620, between the intersection point 691 and the apex 692.

The intersection point 691 is radially spaced from the engine casing 698 to define a clearance (Cl) therebetween. The height (H) is defined as a function of the clearance. As a non-limiting example, the height (H) is between greater than 0% and less than or equal to 90% of the clearance (Cl) with 0% being the intersection point 691. As a non-limiting example, the height (H) is between greater than or equal to 1% and less than or equal to 90% of the clearance (Cl) with 0% being the intersection point 691. It will be appreciated that the height (H) of the projection 680 is not 0% of the clearance (CI).

The tip platform 602 extends a platform width extending axially, with respect to the rotational axis 620, from the fore edge 624 to the aft edge 626. As a non-limiting example, the width (W) of the projection 680 is between greater than 0% and less than or equal to 50% of the platform width, with 0% being the apex 692. As a non-limiting example, the width (W of the projection is between greater than or equal to 1% and less than or equal to 50% of the platform width. It will be appreciated that the width (H) of the projection 680 is not 0% of the platform width.

The height (H) can be equal to or non-equal to the width (W). The width (W) and the height (H) of a projection 680 can be equal to or non-equal to the width (W) and the height (H) of another projection 680 of the set of projections 680. The sizing of the projections 680 through the height (H) and the width (W) is used to further define the direction of the leakage flow in order to further minimize the aerodynamic losses.

Figure 10:
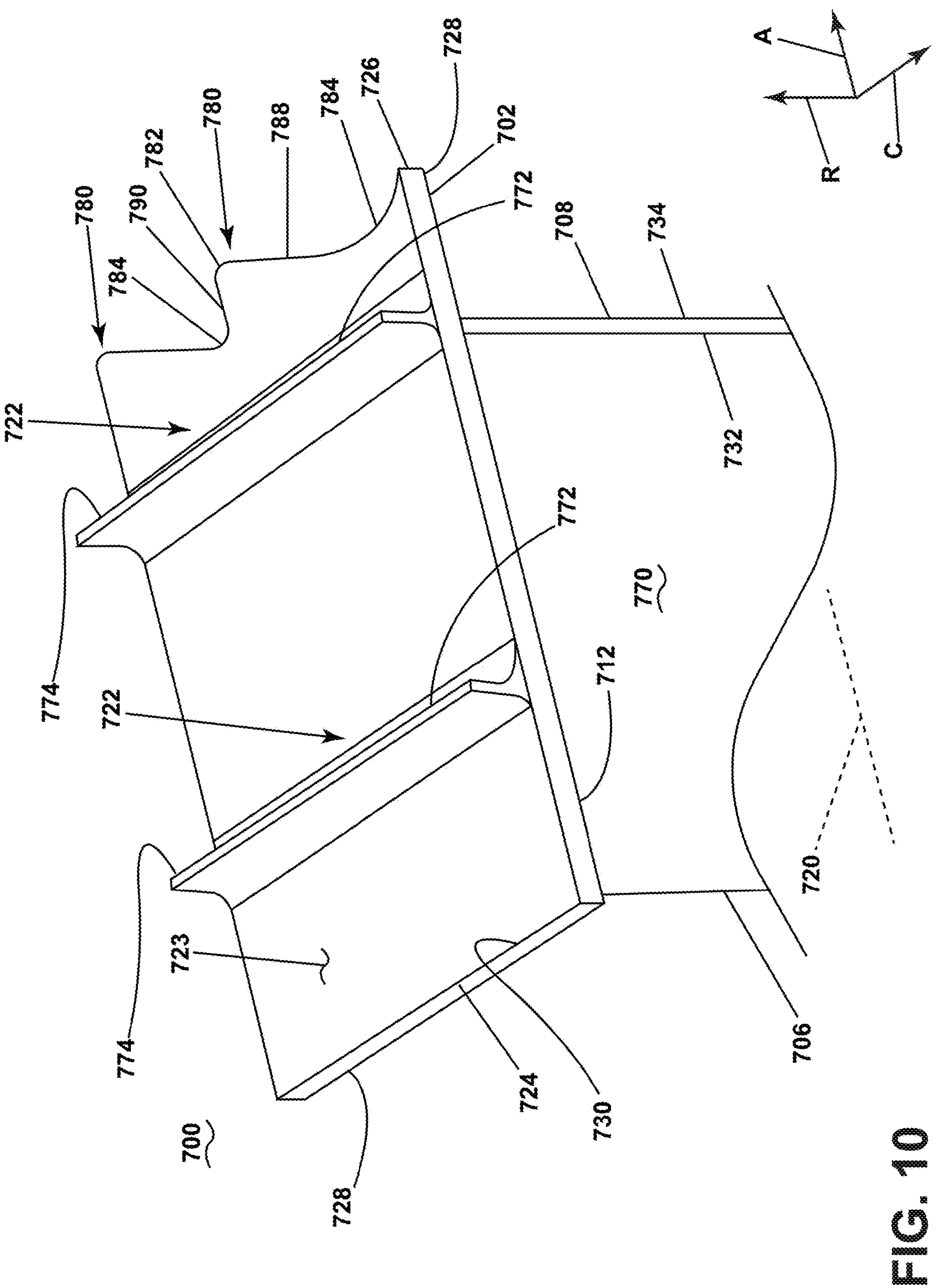
FIG. 10 is a schematic top-down perspective view of an exemplary blade assembly suitable for use as the blade assembly of FIG. 2, further illustrating a contoured aft edge of the tip, the contoured aft edge having a wave formation.

FIG. 10 is a schematic top-down perspective view of an exemplary blade assembly 700 suitable for use as the blade assembly 100 of FIG. 2. The blade assembly 700 is similar to the blade assembly 100, 200, 300, 400, 500, 600. Therefore, like parts will be identified with like numerals increased to the 700 series, with it being understood that the description of the like parts of the blade assembly 100, 200, 300, 400, 500, 600 applies to the blade assembly 700 unless otherwise noted.

The blade assembly 700 includes an airfoil 770 (e.g., the turbine blade 78) extending between a root (not illustrated) and a tip 712, and a leading edge 706 and a trailing edge 708. The airfoil 770 can be defined by an airfoil pressure side 732 and an airfoil suction side 734. The airfoil 770 can be any suitable airfoil configured to rotate about a rotational axis 720. A tip platform 702 can be integrally formed with or operably coupled to the tip 712. The tip platform 702 can extend axially between a fore edge 724 and an aft edge 726, and radially between a first surface 728 and a second surface 730, with respect to the rotational axis 720. The tip platform 702 and the tip 712 can be radially spaced from an engine casing (not illustrated) to define a space 723 therebetween. The at least one fin 722, as illustrated, can extend circumferentially about the rotational axis 720 in a non-contoured fashion. In other words, the at least one fin 722 is not contoured in the circumferential or axial direction. The at least one fin 722 can include at least two fins 722 axially spaced from one another. The at least one fin 722 can include a forward wall 772 and a rear wall 774 can extend radially from the second surface 730.

The blade assembly 700, like the blade assembly 600, includes a projection 780 that defines at least a portion of the aft edge 726. As a non-limiting example, the projection 780 can define a portion of the aft edge 726 of the tip platform 702. As illustrated, the projection 780 can extend in-line or parallel with the second surface 730 of the tip platform 702. It will be appreciated, however, that the projection 780 can be angled with respect to a remainder of the tip platform 702 (e.g., the projection 780 can include a height or amplitude).

The projection 780 differs from the projection 680 in that it is forms an axial wave formation rather radial wave formation like the projection 680 along the aft edge 726. As such, the blade assembly 700 includes an axially contoured aft edge 626. The projection 780 can include at least two projections 780 such that a first projection 780 is circumferentially adjacent to and touching a second projection 780. The first projection 780 and the second projection 780 can form a continuous wave formation about the aft edge 726. The wave formation can be a non-sinusoidal wave, as illustrated, or a sinusoidal wave.

Each projection 780 includes a peak 782 and a valley 784. The peak 782 is connected to the valley 784 through a first leg 788. A second leg 790 interconnects the peak 782 with an adjacent valley 784 of another projection 780. The wave formation formed by the projections 780 includes a series of peaks 782 and valleys 784 with the peaks being axially spaced from the valleys with respect to the rotational axis 720. As such, the aft edge 726 of the tip platform 702 includes an axial contour. The peak 782, as illustrated, is the apex of the peak 782. The width (not illustrated) of the projection 780 is measured between an axial start of the projection 780 and the apex of the peak 782. In this case, the axial start of the projection is the valley 784. The projection 780 does not include a height, but it will be appreciated that the projection 780 can be angled in the radial direction such that it includes a height.

As illustrated, the first leg 788 and the second leg 790 differ from one another. Specifically, the first leg 788 is not a mirror image of the second leg 790 with respect to a vertical plane extending along the rotational axis 720 and intersecting the peak 782. In other words, the projection 780 extends circumferentially about the rotational axis in a non-uniform fashion.

Figure 11:
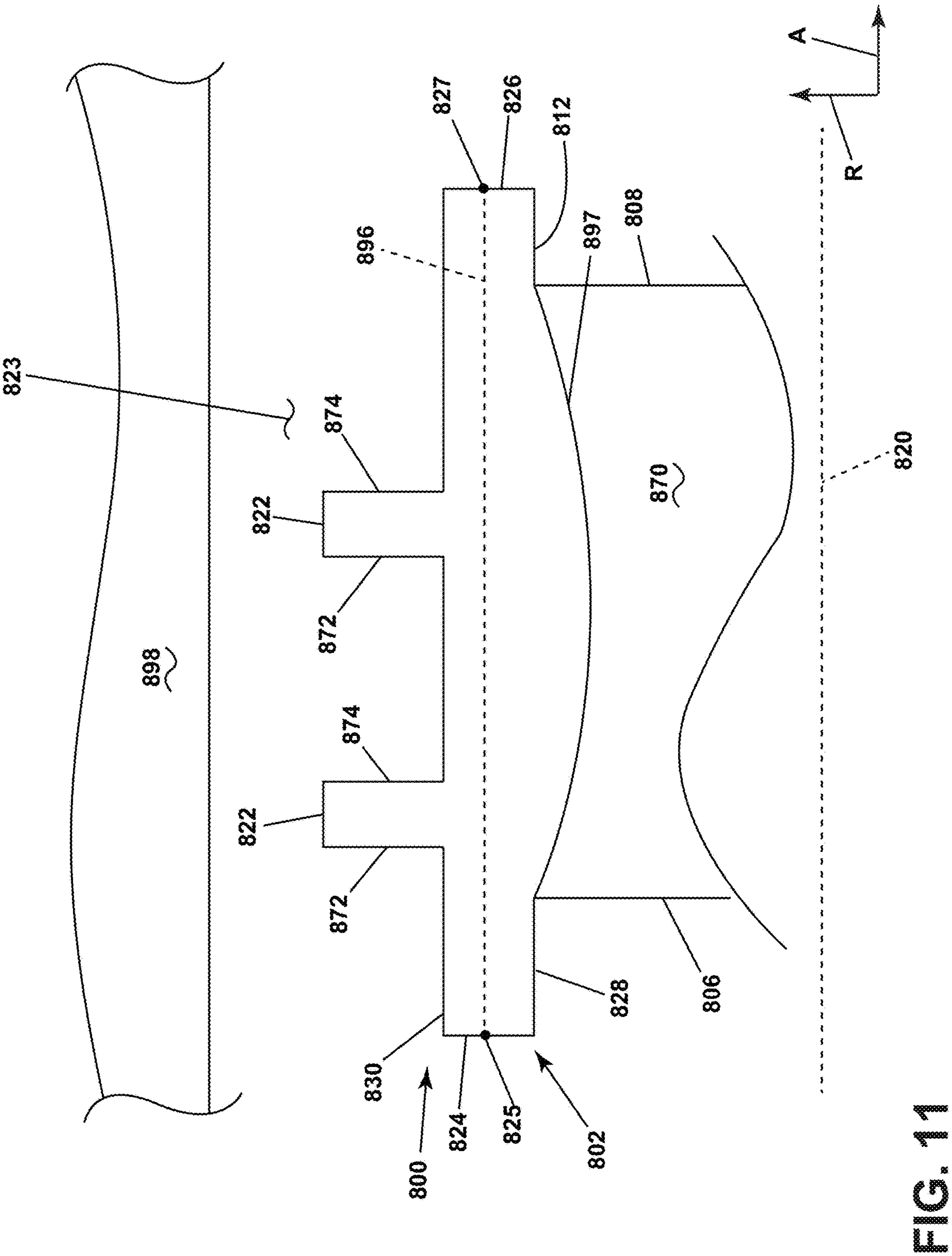
FIG. 11 is a schematic side view of an exemplary blade assembly suitable for use as the blade assembly of FIG. 2, further illustrating a non-linear face of the tip.

FIG. 11 is a schematic top-down perspective view of an exemplary blade assembly 800 suitable for use as the blade assembly 100 of FIG. 2 The blade assembly 800 is similar to the blade assembly 100, 200, 300, 400, 500, 600, 700. Therefore, like parts will be identified with like numerals increased to the 800 series, with it being understood that the description of the like parts of the blade assembly 100, 200, 300, 400, 500, 600, 700 applies to the blade assembly 800 unless otherwise noted.

The blade assembly 800 includes an airfoil 870 (e.g., the turbine blade 70) extending between a root (not illustrated) and a tip 812, and a leading edge 806 and a trailing edge 808. The airfoil 870 can be defined by an airfoil pressure side and an airfoil suction side. The airfoil 870 can be any suitable airfoil configured to rotate about a rotational axis 820. A tip platform 802 can be integrally formed with or operably coupled to the tip 812. The tip platform 802 can extend axially between a fore edge 824 and an aft edge 826, and radially between a first surface 828 and a second surface 830, with respect to the rotational axis 820. The tip platform 802 and the tip 812 can be radially spaced from an engine casing 898 to define a space 823 therebetween. The at least one fin 822, as illustrated, can extend circumferentially about the rotational axis 820 in a non-contoured fashion. In other words, the at least one fin 822 is not contoured in the circumferential or axial direction. The at least one fin 822 can include at least two fins 822 axially spaced from one another. The at least one fin 822 can include a forward wall 872 and a rear wall 874 can extend radially from the second surface 830.

The tip platform 802 is similar to the tip platform 102, 202, 302, 402, 502, 602, 702, however the tip platform 802 includes a non-linear first surface 828. A horizontal plane 896 extends between a first point 825 provided on the fore edge 824 and a second point 827 provided on the aft edge 826. The first point 825 and the second point 827 are radially halfway between where the fore edge 824 and the aft edge 826, respectively, meets the first surface 828 and the second surface 830. The first surface 828 can include a non-constant radial height between the first surface 828 and a respective portion of the horizontal plane 896 with respect to the rotational axis 820 between the aft edge 826 and fore edge 824

A bulge 897 or protrusion is defined by the non-constant radial height. The bulge 897 can be formed along any suitable portion of the first surface 828. As a non-limiting example, the bulge 897 can extend from the leading edge 806 to the trailing edge 808 of the airfoil 870. While illustrated as extending from the first surface 828, it will be appreciated that the bulge 897 can extend from any suitable portion of the tip platform 802 or the tip 812. As a non-limiting example, the bulge 897 can extend from the second surface 830 and into the space 823.

The bulge 897 can be used to further minimize losses associated with the operation of the blade assembly 800 and direct the working airflow. The bulge 897 can be used to increase or decrease a cross-sectional area of the mainstream flow path through when viewed along a vertical plane extending along the rotational axis 820 and intersecting the bulge 897. The reduction of the cross-sectional area helps in redistributing the pressure in the path, thereby minimizes a migration of the flow between two circumferentially adjacent airfoils 870. This, in turn, results in improved aerodynamic performance.

It will be appreciated that any two or more of the blade assemblies 100, 200, 300, 400, 500, 600, 700, 800 described herein can be combined with one another. As a non-limiting example, any portions of the blade assemblies 100, 200, 300, 400, 500, 600, 700, 800 can be combined as suitable. As a non-limiting example, the tip platform can include an aft edge defined by a fin (e.g., the blade assembly 600, 700) and further include at least one fin extending radially from another portion of the tip platform (e.g., the fin 122, 222, 322, 422, 522).

Benefits of the present disclosure include a more efficient blade assembly when compared to a conventional blade assembly. For example, the conventional blade assembly can include various projections (e.g., finger seals) that extend radially outward from a tip platform. The projections are used to create a labyrinth in an attempt to eliminate the leakage airflow from flowing with a space that is radially outward from the airfoil the blade assembly. The projections do not eliminate the leakage airflow. Thus, some leakage airflow still flows through the space and ultimately has to merge with the working airflow downstream of the blade assembly. The leakage airflow, in turn, can create aerodynamic losses, which can ultimately negatively affect the efficiency of the blade assembly. Further yet, the projections are provided on the blade assembly. A more robust projection results in greater efficiency in reducing the leakage airflow, however, raises the overall weight of the blade assembly. Raising the overall weight, in turn, increases the force need to rotate the blade assembly, thus decreasing the overall efficiency of the blade assembly. The blade assembly as described herein, however, includes the at least one fin or the non-linear first surface of the tip platform. The at least one fin can be used to retard the leakage airflow within the space by creating a tortuous path for the leakage airflow, similar to how the projections of the conventional blade assembly retard the leakage airflow. However, the at least one fin and the non-linear first surface can be used to further redirect the leakage airflow or working airflow and further extract at least some torque from the working airflow or leakage airflow. The redirection of the leakage airflow and working airflow, in turn, reduces the aerodynamic losses associated with the leakage airflow merging with the working airflow downstream of the blade assembly. The redirection further results in ensuring that the working airflow and leakage airflow downstream of the blade assembly are in-line with any downstream airfoil. As such, the redirection results in lower aerodynamic losses, and thus an increased efficiency of the blade assembly and turbine engine, when compared to the conventional blade assembly and conventional turbine engine. As the at least one fin can extract torque from the leakage airflow, the efficiency and torque output of the blade assembly is increased when compared to the conventional blade assembly that does not use the leakage airflow to generate any sort of torque. Further yet, as the at least one fin can be provided on the engine casing or a casing surrounding the blade assembly (e.g., the at least one fin is not provided on a rotating portion of the blade assembly), the overall weight of the rotating portions of the blade assembly is reduced. This, in turn, reduces the force required to rotate the blade assembly thus increasing the efficiency of the blade assembly when compared to the conventional blade assembly.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A blade assembly for a gas turbine engine having an engine casing, the blade assembly configured to rotate about a rotational axis, the blade assembly comprising a blade extending between a root and a tip, and between a blade leading edge and a blade trailing edge, with the tip being spaced radially from the engine casing to define a space therebetween, and at least one fin extending radially with respect to the tip and into the space, with the at least one fin having a circumferential contour.

A blade assembly configured to rotate about a rotational axis, comprising an annular array of circumferentially spaced blades, with each blade of the annular array of circumferentially spaced blades extending between a root and a tip and between a blade leading edge and a blade trailing edge, and at least one fin extending radially with respect to at least one tip and into the space, with the at least one fin having a circumferential contour.

A blade assembly for a gas turbine engine having an engine casing, the blade assembly configured to rotate about a rotational axis, the blade assembly comprising a blade extending between a root and a tip, with the tip being spaced radially from the casing to define a space therebetween, and a tip platform operably coupled to the tip and extending between a fore edge and an aft edge axially spaced from the fore edge with respect to the rotational axis, the tip platform having at least one projection extending into the space and forming a respective portion of the aft edge and forming a wave formation along the aft edge.

A blade assembly configured to rotate about a rotational axis, comprising a blade extending between a root and a tip and between a blade leading edge and a blade trailing edge, and a tip platform operably coupled to the tip and extending between a fore edge and an aft edge axially spaced from the fore edge with respect to the rotational axis, the tip platform having at least one projection forming a respective portion of the aft edge and forming a wave formation along the aft edge.

A blade assembly for a gas turbine engine having an engine casing, the blade assembly configured to rotate about a rotational axis, the blade assembly comprising, a blade extending between a root and a tip, and between a blade leading edge and a blade trailing edge to define a chord-wise direction, with the tip being spaced radially from the engine casing to define a space therebetween, and a first fin extending radially outwardly from the tip and toward the outer casing, the first fin comprising, a leading edge and a trailing edge with a mean camber line formed therebetween, with the mean camber line intersecting the leading edge to define a leading edge intersection, and intersecting the trailing edge to define a trailing edge intersection, wherein the mean camber line extends substantially in the chord-wise direction.

A blade assembly configured to rotate about a rotational axis, comprising an annular array of circumferentially spaced blades, with each blade of the annular array of circumferentially spaced blades extending between a root and a tip, and between a blade leading edge and a blade trailing edge to define a chord-wise direction, with the tip being spaced radially from the engine casing to define a space therebetween, and a first fin extending radially outwardly from at least one tip, the first fin comprising a leading edge and a trailing edge with a mean camber line formed therebetween, with the mean camber line intersecting the leading edge to define a leading edge intersection, and intersecting the trailing edge to define a trailing edge intersection, wherein the mean camber line extends substantially in the chord-wise direction.

A blade assembly for a gas turbine engine having an engine casing, the blade assembly configured to rotate about a rotational axis, the blade assembly comprising, a blade extending between a root and a tip, and between a blade leading edge and a blade trailing edge, with the tip being spaced radially from the engine casing to define a space therebetween, and at least one fin extending radially from the tip with respect to the rotational axis and having at least one slot extending axially through the at least one fin.

A blade assembly configured to rotate about a rotational axis, comprising an annular array of circumferentially spaced blades, with each blade of the annular array of circumferentially spaced blades extending between a root and a tip, and between a blade leading edge and a blade trailing edge, with the tip being spaced radially from the engine casing to define a space therebetween, and at least one fin extending radially from at least one tip with respect to the rotational axis and having at least one slot extending axially through the at least one fin.

A blade assembly for a gas turbine engine having an engine casing, the blade assembly configured to rotate about a rotational axis, the blade assembly comprising a blade extending between a root and a tip, and between a blade leading edge and a blade trailing edge, with the tip being spaced radially from the engine casing to define a space therebetween, wherein the tip comprises a fore edge, an aft edge, axially spaced from the fore edge, a second surface, and a first surface radially spaced outwardly form the second surface with respect to the rotational axis, wherein the first surface includes a non-constant radial height between a horizontal plane intersecting a first point radially halfway between where the fore edge meets the first surface and the second surface, and a second point radially halfway between where the aft edge meets the first surface and the second surface.

A blade assembly configured to rotate about a rotational axis, comprising an annular array of circumferentially spaced blades, with each blade of the annular array of circumferentially spaced blades extending between a root and a tip, and between a blade leading edge and a blade trailing edge, with the tip being spaced radially from the engine casing to define a space therebetween, wherein at least one tip comprises a fore edge, an aft edge, axially spaced from the fore edge, a second surface, and a first surface radially spaced outwardly form the second surface with respect to the rotational axis, wherein the first surface includes a non-constant radial height between a horizontal plane intersecting a first point radially halfway between where the fore edge meets the first surface and the second surface, and a second point radially halfway between where the aft edge meets the first surface and the second surface.

The blade assembly of any preceding clause, wherein the at least one fin is contoured in an axial direction, with respect to the rotational axis, and extends between a leading edge and a trailing edge with a mean camber line formed therebetween, with the mean camber line intersecting the leading edge to define a leading edge intersection, and intersecting the trailing edge to define a trailing edge intersection.

The blade assembly of any preceding clause, wherein the fin includes a first included angle between a first straight line parallel to the mean camber line at the leading edge intersection and the rotational axis, and a second included angle between a second straight line parallel to the mean camber line at the trailing edge intersection and the rotational axis, and the blade includes a first blade included angle between a line parallel to a mean camber line of the blade where the blade leading edge meets the tip, and a second blade included angle between a line parallel to the mean camber line of the blade where the blade trailing edge meets the tip.

The blade assembly of any preceding clause, wherein the first included angle is plus or minus 25 degrees of the first blade included angle.

The blade assembly of any preceding clause, wherein the second included angle is plus or minus 25 degrees of the second blade included angle.

The blade assembly of any preceding clause, wherein the first included angle is equal to the second included angle.

The blade assembly of any preceding clause, wherein the at least one fin is a projection of the blade extending radially through the tip.

The blade assembly of any preceding clause, wherein the at least one fin includes an airfoil cross section, when viewed along a horizontal plane extending along the mean camber line.

The blade assembly of any preceding clause, wherein the at least one fin includes at least one slot extending axially through the at least one fin.

The blade assembly of any preceding clause, further comprising a plurality of circumferentially spaced slots formed along the at least one fin.

The blade assembly of any preceding clause, wherein the at least one fin includes a first fin and a second fin that extends radially from the engine casing and into the space.

The blade assembly of any preceding clause, wherein the at least one fin further comprises a forward wall and at least one projection extending axially outward from the forward wall.

The blade assembly of any preceding clause, wherein the at least one projection forms a hook extending axially, radially, and circumferentially with respect to the rotational axis.

The blade assembly of any preceding clause, wherein the at least one projection is included within a plurality of projections with each projection of the plurality of projections circumferentially spaced with respect to one another and extending from a corresponding portion of the forward wall.

The blade assembly of any preceding clause, wherein the tip comprises a fore edge, an aft edge, axially spaced from the fore edge, and a projection defining a contour of the aft edge.

The blade assembly of any preceding clause, wherein the projection forms a wave formation that includes a series of peaks and valleys radially spaced from one another, or axially spaced from one another.

The blade assembly of any preceding clause, wherein the tip comprises a fore edge, an aft edge, axially spaced from the fore edge, a first surface and a second surface radially spaced outwardly form the first surface with respect to the rotational axis, and wherein the first surface includes a non-constant radial height between a horizontal plane intersecting a first point radially halfway between where the fore edge meets the first surface and the second surface, and a second point radially halfway between where the aft edge meets the first surface and the second surface.

The blade assembly of any preceding clause, further comprising a tip platform operably coupled to the tip with the at least one fin being operably coupled to the tip platform.

The blade assembly of any preceding clause, wherein the gas turbine engine further comprises a low pressure turbine, with the blade assembly being provided within the low pressure turbine.

The blade assembly of any preceding clause, wherein the wave formation includes a peak, a valley, a first leg interconnecting the peak and the valley, and a second leg extending from the peak opposite the first leg.

The blade assembly of any preceding clause, wherein the peak is axially spaced from the valley with respect to the rotational axis.

The blade assembly of any preceding clause, wherein the wave formation includes an axial contour.

The blade assembly of any preceding clause, wherein the first leg is a not a mirror image of the second leg with respect to a vertical plane extending along the rotational axis and intersecting the peak.

The blade assembly of any preceding clause, wherein the peak is radially spaced from the valley with respect to the rotational axis.

The blade assembly of any preceding clause, wherein the first leg is a mirror image of the second leg with respect to a vertical plane extending along the rotational axis and intersecting the peak.

The blade assembly of any preceding clause, wherein the peak defines a surface terminating at an apex.

The blade assembly of any preceding clause, wherein the projection includes a width, which extends axially with respect to the rotational axis, between a radially outer start of the projection and the apex.

The blade assembly of any preceding clause, wherein the tip platform includes a platform width extending axially between the fore edge and the aft edge, and the width of the projection is greater than 0% and less than or equal to 50% of the platform width.

The blade assembly of any preceding clause, wherein the projection includes a height, which extends radially with respect to the rotational axis, between a radially outer start of the projection and the apex.

The blade assembly of any preceding clause, wherein a clearance is formed between the radially outer start of the projection and a radially adjacent portion of the engine casing, with the height extending between greater than 0% and less than 90% of the clearance.

blade assembly of any preceding clause, wherein the projection extends circumferentially about the rotational axis in a non-uniform fashion.

The blade assembly of any preceding clause, wherein the at least one projection is included within a plurality of projections formed along the aft edge.

The blade assembly of any preceding clause, wherein each projection of the plurality of projections includes a peak, a valley, a first leg interconnecting the peak and the valley and a second leg interconnecting the peak with an adjacent valley of an adjacent projection.

The blade assembly of any preceding clause, wherein the plurality of projections are continuously formed along the aft edge.

The blade assembly of any preceding clause, wherein the plurality of projections extend about an entire circumference of the tip platform with respect to the rotational axis.

The blade assembly of any preceding clause, wherein the tip platform comprises a first surface and a second surface radially spaced outwardly form the first surface with respect to the rotational axis, and wherein the first surface includes a non-constant radial height between a horizontal plane intersecting a first point radially halfway between where the fore edge meets the first surface and the second surface, and a second point radially halfway between where the aft edge meets the first surface and the second surface.

The blade assembly of any preceding clause, wherein the wave formation includes at least one of either an axial contour or a radial contour.

What is claimed is:

1. A turbine engine comprising:

an engine casing; and a blade assembly configured to rotate about a rotational axis, the blade assembly comprising:

a blade having an outer wall extending between a root and a tip, and between a blade leading edge and a blade trailing edge;

a tip platform provided along the tip of the blade, the tip platform being radially spaced from the engine casing to define a space therebetween; and a fin extending radially into and circumferentially within the space, the fin having:

a wall extending radially and terminating at a distal end within the space with respect to the tip platform; and a plurality of circumferentially spaced fin projections, each fin projection extending axially outward from the wall and being formed as a hook.

2. The turbine engine of claim 1, wherein each fin projection has a first leg extending axially from the wall, and a second leg extending from the first leg and being non-parallel to the first leg.

3. The turbine engine of claim 2, wherein the second leg extends from the first leg at a 90 degree angle.

4. The turbine engine of claim 2, wherein each second leg of the plurality of fin projections extends from a respective first leg in a same circumferential direction between fin projections of the plurality of fin projections, with respect to the rotational axis.

5. The turbine engine of claim 1, wherein the fin is included in a plurality of fins axially spaced with respect to one another.

6. The turbine engine of claim 5, wherein a single fin of the plurality of fins includes the plurality of fin projections.

7. The turbine engine of claim 6, wherein the single fin is a farthest axially forward fin of the plurality of fins.

8. The turbine engine of claim 1, wherein the plurality of circumferentially spaced fin projections are arranged in a series and spaced along the wall.

9. The turbine engine of claim 1, wherein each fin projection extends from a forward surface of the wall.

10. The turbine engine of claim 1, wherein the blade is included in a plurality of circumferentially spaced blades, and the tip platform extends at least from the tip of a first blade of the plurality of circumferentially spaced blades and to the tip of a second blade of the plurality of circumferentially spaced blades, with the first blade being circumferentially adjacent to the second blade.

11. The turbine engine of claim 1, wherein the tip platform forms a continuous annulus about the rotational axis.

12. The turbine engine of claim 1, wherein:

the tip platform extends between a fore edge and an aft edge, and the tip platform comprises a first surface and a second surface radially spaced outwardly from the first surface with respect to the rotational axis; and the first surface is spaced at a non-constant radial distance along a span of the first surface from the fore edge and to the aft edge, the non-constant radial distance being with respect to a horizontal plane, the horizontal plane intersecting a first point radially halfway between where the fore edge meets the first surface and the second surface, and a second point radially halfway between where the aft edge meets the first surface and the second surface.

13. The turbine engine of claim 1, wherein the tip platform further comprises a set of projections circumferentially spaced along an aft edge, the set of projections forming a series of alternating peaks and valleys interconnected by a set of legs to define a set of voids defined as a circumferential area between circumferentially adjacent legs of the set of legs.

14. The turbine engine of claim 1, wherein the tip platform is segmented to define multiple discrete platforms that collectively extend circumferentially about an entirety of the rotational axis.

15. The turbine engine of claim 1, wherein the tip platform further comprises a set of projections forming an axial wave along a portion of the tip platform.

16. The turbine engine of claim 1, wherein the fin extends radially outward from the tip platform.

17. The turbine engine of claim 1, further comprising a low pressure turbine, with the blade being provided within the low pressure turbine.

18. A turbine engine comprising:

an engine casing; and a blade assembly configured to rotate about a rotational axis, the blade assembly comprising:

a blade having an outer wall extending between a root and a tip, and between a blade leading edge and a blade trailing edge;

a tip platform provided along the tip of the blade, the tip platform being radially spaced from the engine casing to define a space therebetween; and a fin extending radially into and circumferentially within the space, the fin having:

a wall extending radially and terminating at a distal end within the space with respect to the tip platform; and a fin projection extending axially outward from the wall, wherein the tip platform further comprises a set of projections circumferentially spaced along an aft edge, the set of projections forming a series of alternating peaks and valleys interconnected by a set of legs to define a set of voids defined as a circumferential area between circumferentially adjacent legs of the set of legs.

* * * * *